(12) United States Patent
Ekbote

(10) Patent No.: US 8,894,086 B2
(45) Date of Patent: Nov. 25, 2014

(54) CART CONNECTION ASSEMBLIES AND METHODS

(71) Applicant: Gatekeeper Systems, Inc., Irvine, CA (US)

(72) Inventor: Chandrashekhar Ekbote, Irvine, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 0 days.

(21) Appl. No.: 14/073,615

(22) Filed: Nov. 6, 2013

(65) Prior Publication Data

US 2014/0062062 A1 Mar. 6, 2014

Related U.S. Application Data

(63) Continuation of application No. PCT/US2012/037151, filed on May 9, 2012.

(60) Provisional application No. 61/484,627, filed on May 10, 2011.

(51) Int. Cl.
*B60D 1/40* (2006.01)
*B62B 5/00* (2006.01)
*B60D 1/07* (2006.01)
*B60D 1/02* (2006.01)
*B62B 3/14* (2006.01)
*B60D 1/00* (2006.01)

(52) U.S. Cl.
CPC .............. *B60D 1/40* (2013.01); *B62B 2207/02* (2013.01); *B62B 5/0079* (2013.01); *B60D 2001/005* (2013.01); *B60D 1/075* (2013.01); *B60D 1/02* (2013.01); *B62B 3/1404* (2013.01)

USPC ........................................... 280/509

(58) Field of Classification Search
USPC .............. 280/508, 509, 510, 434, 460.1, 19.1
See application file for complete search history.

(56) References Cited

U.S. PATENT DOCUMENTS 806,216 A * 12/1905 Van Wye ........................ 280/509
856,795 A * 6/1907 Morris ........................... 280/509
(Continued)

FOREIGN PATENT DOCUMENTS

EP 2165916 A2 3/2010
FR 2587291 A1 5/1990
(Continued)

OTHER PUBLICATIONS

Gatekeeper Systems, "CartManager: Moving Cart Retrieval Forward", Aug. 1, 2007, 4 pages.

(Continued)

*Primary Examiner* — Kevin Hurley
(74) *Attorney, Agent, or Firm* — Knobbe, Martens, Olson & Bear, LLP

(57) ABSTRACT

In certain embodiments, a connection assembly can engage a cart, such as a retail shopping cart, to facilitate pushing and/or pulling the cart or a number of carts that have been nested together. In some embodiments, the connection assembly includes an engagement member with a recess. In an open position of engagement member, the recess can be configured to receive a portion of a frame member of the cart. In a closed position of the engagement member, the portion of the frame member can be secured with the connection assembly, thereby providing a secure connection with the cart to facilitate movement of the cart to a desired location.

19 Claims, 17 Drawing Sheets

(56) References Cited

U.S. PATENT DOCUMENTS

| | | | | |
|---|---|---|---|---|
| 2,467,816 A | * | 4/1949 | Cutsinger et al. | 280/509 |
| 2,597,096 A | * | 5/1952 | Harris | 280/509 |
| 2,869,654 A | * | 1/1959 | Hershman | 172/272 |
| 3,266,817 A | * | 8/1966 | Engstrom | 172/275 |
| 3,420,551 A | * | 1/1969 | McMillan | 280/509 |
| 3,512,804 A | * | 5/1970 | Siegert | 280/509 |
| 4,093,900 A | | 6/1978 | Plunkett | |
| 4,771,840 A | | 9/1988 | Keller | |
| 5,161,634 A | | 11/1992 | Ichihara et al. | |
| 5,244,047 A | * | 9/1993 | Eudy | 172/275 |
| 5,340,202 A | | 8/1994 | Day | |
| 5,439,069 A | | 8/1995 | Beeler | |
| 5,743,347 A | | 4/1998 | Gingerich | |
| 5,823,548 A | | 10/1998 | Reiland et al. | |
| 5,831,530 A | | 11/1998 | Lace et al. | |
| 5,934,694 A | | 8/1999 | Schugt et al. | |
| 6,070,679 A | * | 6/2000 | Berg et al. | 180/19.2 |
| 6,220,379 B1 | | 4/2001 | Schugt et al. | |
| 6,362,728 B1 | | 3/2002 | Lace et al. | |
| 6,390,314 B1 | * | 5/2002 | Pinlam et al. | 213/75 R |
| 6,394,481 B1 | * | 5/2002 | Pinlam et al. | 280/510 |
| 6,945,366 B2 | | 9/2005 | Taba | |
| 7,219,754 B2 | | 5/2007 | Johnson | |
| 7,369,968 B2 | | 5/2008 | Johnson et al. | |
| 7,389,836 B2 | | 6/2008 | Johnson et al. | |
| 7,395,886 B2 | | 7/2008 | Berg et al. | |
| 7,474,218 B2 | | 1/2009 | Johnson et al. | |
| 7,493,979 B2 | | 2/2009 | Johnson et al. | |
| 7,496,532 B2 | | 2/2009 | Johnson et al. | |
| 7,512,523 B2 | | 3/2009 | Johnson et al. | |
| 7,533,742 B2 | | 5/2009 | Johnson et al. | |
| 7,549,651 B2 | | 6/2009 | Holtan et al. | |
| 7,571,914 B2 | | 8/2009 | Holtan et al. | |
| 7,857,342 B2 | | 12/2010 | Holtan et al. | |
| 7,944,368 B2 | | 5/2011 | Carter et al. | |
| 8,046,160 B2 | | 10/2011 | Carter et al. | |
| 8,360,459 B2 | | 1/2013 | Holtan et al. | |
| 8,463,540 B2 | | 6/2013 | Hannah et al. | |
| 8,674,845 B2 | | 3/2014 | Carter et al. | |
| 8,751,148 B2 | | 6/2014 | Carter et al. | |
| 2004/0256166 A1 | | 12/2004 | Holtan et al. | |
| 2006/0249320 A1 | | 11/2006 | Carter et al. | |
| 2007/0096899 A1 | | 5/2007 | Johnson | |
| 2007/0174438 A9 | | 7/2007 | Johnson et al. | |
| 2007/0181352 A1 | | 8/2007 | Holtan et al. | |
| 2007/0289787 A1 | | 12/2007 | Wiff et al. | |
| 2008/0243687 A1 | | 10/2008 | Johnson et al. | |
| 2008/0257618 A1 | | 10/2008 | Johnson et al. | |
| 2009/0072977 A1 | | 3/2009 | Johnson et al. | |
| 2009/0267322 A1 | | 10/2009 | Holtan et al. | |
| 2010/0078905 A1 | | 4/2010 | Holtan | |
| 2011/0109054 A1 | | 5/2011 | Holtan et al. | |
| 2013/0098698 A1 | | 4/2013 | Johnson et al. | |

FOREIGN PATENT DOCUMENTS

| | | |
|---|---|---|
| JP | 58-145511 | 8/1983 |
| WO | WO 2005/030555 A2 | 4/2005 |

OTHER PUBLICATIONS

Gatekeeper Systems, "CartManager XD Owner/Operator Training and Troubleshooting Guide", Version 1.0, Jul. 2007, 48 pages.

Dane Industries, "Quickart 2000 Operating Instructions", undated, 49 pages.

Dane Technologies, "Dane Technologies Hitch Catalog", Jun. 1, 2009, 16 pages.

International Search Report and Written Opinion for International Application No. PCT/US2012/037151, mailed Nov. 23, 2012, 9 pages.

International Preliminary Report on Patentability for International Application No. PCT/US2012/037151, mailed Nov. 21, 2013, 6 pages.

* cited by examiner

CART CONNECTION ASSEMBLIES AND METHODS

CROSS-REFERENCE TO RELATED APPLICATIONS

This application claims the benefit under 35 U.S.C. §§120 and 365(c) as a continuation of International Application No. PCT/US2012/037151, designating the United States, with an international filing date of May 9, 2012, titled "CART CONNECTION ASSEMBLIES AND METHODS," which claims the priority benefit under 35 U.S.C. §119(e) of U.S. Provisional Patent Application No. 61/484,627, filed May 10, 2011, titled "CART CONNECTOR ASSEMBLY," the entirety of each of which is incorporated herein by reference.

BACKGROUND

1. Field

The following disclosure relates to a connection assembly, for example, a mechanism to quickly attach and detach one or more shopping carts.

2. Description of the Related Art

Many retail establishments provide carts, such as shopping carts, to guests for their shopping convenience. In certain environments, the carts may be designed to be transported outside of the store, such as into a parking lot, to aid in transporting various items to the customers' vehicles. Sometimes, customers are encouraged to leave the carts in the lot, such as in a designated cart corral area. However, in order for the carts to be readily accessible for additional store customers, the carts need to be transported back to the store.

To facilitate transporting the carts, a cart retriever may be used. A cart retriever is a motorized mobile unit that provides motive force (e.g., by pushing or pulling) to a chain of nested carts. In order to provide such force, the cart retriever generally is coupled with at least one of the chain of carts using a connection assembly. For example, the connection assembly can be used to couple the cart retriever to the rear-most cart in the chain.

SUMMARY OF THE DISCLOSURE

Several embodiments of connection assemblies are disclosed. According to some embodiments, a cart retriever is fitted with a connection assembly configured to couple and decouple with a shopping cart. Used herein the term "cart" has its ordinary meaning and can include without limitation, a human-propelled wheeled vehicle, a non-motor-propelled wheeled vehicle, and any such vehicles can include without limitation, shopping carts, wheeled baskets, freight and warehouse carts, beds (e.g., medical beds), wheelchairs, handtrucks, wagons, luggage carts, and the like. In some embodiments, one, two, three, four, or more of the wheels of the cart are configured to swivel.

According to some embodiments, a cart connection assembly that is configured to releasably connect with a shopping cart to facilitate movement of the cart includes a housing configured to couple with a cart retriever and an engagement member. The engagement member can be pivotally connected with the housing. In some variants, the engagement member has a recess and a flange. The engagement member can be rotatable between a first position and a second position with respect to the housing. In some embodiments, when in the first position, the engagement member can receive a leg portion of a shopping cart in the recess. In certain embodiments, when in the second position, the leg portion is inhibited from being removed from the recess.

In some implementations, the cart connection assembly includes a latch that is configured to engage the flange of the engagement member when the engagement member is in the second position, thereby retaining the engagement member in the second position. Certain variants include a release (e.g., a hand or foot operated lever, button, knob, switch, handle, or otherwise) that is configured to disengage the latch and the flange, thereby allowing the engagement member to move from the second position to the first position. Some embodiments include a biasing element, such as a spring, that is configured to bias the engagement member toward the first position.

In certain embodiments of the connection assembly, the recess opens toward a front of the housing. The opening of the recess can be generally unobstructed, which can facilitate access by the leg portion of the shopping cart. In some embodiments, the connection assembly has a plurality of engagement members and a corresponding plurality of latches. In some variants, a lateral spacing between at least two of the plurality of engagement members is adjustable. Such a configuration can allow for the connection assembly to connect with shopping carts of various widths.

According to some implementations, when the cart is moved into the recess and into abutment with the engagement member, the engagement member is encouraged to rotate from the first position toward the second position. In some embodiments, the latch further comprises a cam element (e.g., an angled, curved, or notched face) that is configured to engage the engagement member when the engagement member rotates from the first position toward the second position. In certain implementations, the latch has a slot, aperture, or opening that is configured to engage the flange of the engagement member.

In some embodiments, the latch has a latched position and an unlatched position. The connection assembly can have a spring configured to bias the latch toward the latched position. The release can be configured to rotate the latch from the latched position to the unlatched position. The release can be manually actuated, for example, a foot or hand lever.

In certain embodiments, the leg portion of the shopping cart includes a rear leg portion of the cart. For example, the rear leg that connects with a non-pivoting wheel. In some embodiments, at least part of the rear leg portion is generally vertical.

In some embodiments, the housing is pivotably mounted to the cart retriever. For example, the one of the housing and the cart retriever can include a mount and the other can include a hinge configured to pivotally couple with the mount. Some embodiments of the connection assembly also include the cart retriever.

According to some embodiments, a connection assembly that is configured to releasably connect with a shopping cart and has a front-to-rear axis along which carts are collected includes a housing that is configured to couple with a cart retriever. The housing can include a notch, which can have a notch axis. The notch axis can be generally parallel to the front-to-rear axis. In some implementations, an engagement member includes a recessed portion that has a recess axis. The engagement member can be rotatably connected with the housing such that the engagement member can rotate relative to the housing between a first position and a second position.

In some embodiments, the notch axis and the recess axis are generally parallel when the engagement member is in the first position. Such a configuration can, for example, allow the leg portion of the cart to be received in the notch and the recess. In certain implementations, the notch axis and the recess axis are generally perpendicular when the engagement member is in the second position. Such a configuration can, for example, inhibit or prevent removal of the cart from the notch and the recess, thus securely coupling the connection assembly.

In certain variants, the connection assembly includes a biasing element, such as a spring. The biasing element can be configured to bias the engagement member toward the first position such that the engagement member rotates from the second position. In some implementations, the biasing element can rotate the engagement member toward the first position with sufficient force to eject the leg portion of the cart from the recess. Thus, the connection assembly can automatically eject the cart from the connection assembly.

In some implementations, the connection assembly includes a latch member that is connected with the housing. The latch member can be configured to engage the engagement member when the engagement member is in the second position. In certain variants, such engagement between the latch member and the engagement member inhibits the engagement member from rotating toward the first position. In some embodiments, the connection assembly includes a release that is configured to disengage the latch member from the engagement member, thereby allowing the engagement member to rotate toward the first position, such as due to the bias of the biasing element.

In some embodiments, a method of connecting a shopping cart to a connection assembly that is configured to connect with a cart retriever and has a front-to-rear axis along which carts are collected includes guiding a portion of a shopping cart along a guide member and generally toward a notch of a housing of the connection assembly. The method can also include guiding the portion of the cart toward a recess of an engagement member that is rotatably coupled with the housing. In certain implementations, the method includes receiving a leg portion of the shopping cart in the recess and the notch. Some variants of the method include engaging the leg portion of the cart with a portion of the recess.

According to certain variants, the method includes rotating the engagement member from a first position to a second position about an axis of rotation that is generally perpendicular to the front-to-rear axis. The engagement member can be configured to secure the shopping cart in the connection assembly. In some embodiments, the method includes engaging the engagement member with a cam element of a latch member, thereby displacing the latch relative to the engagement member. In certain implementations, the method includes positioning the engagement member in a slot in the latch, thereby inhibiting counter-rotation of the engagement member.

In some embodiments, the method includes actuating a release to disengage the engagement member from the slot, thereby allowing the engagement member to counter-rotate and to disengage the shopping cart from the connection assembly. In certain embodiments, the method includes biasing the engagement member toward the first position.

In certain implementations, a first cart is attached to the connection assembly and one or more carts are nested to the first cart. In some such configurations, the connection assembly is configured to allow the cart retriever to pull or push the nested chain of carts. Certain embodiments include a release to disengage the cart from the cart retriever. Advantages of one or more of the methods and apparatuses disclosed include, for example, a quick and easy way of attaching and detaching the cart to the cart retriever along the axis of transport of the carts.

In certain embodiments, a connection assembly can guide a cart, such a shopping cart, into a locking position. In some embodiments, the connection assembly can secure the cart to a cart retriever, to facilitate pushing and/or pulling the cart or a number of carts that have been nested together. In various implementations, the connection assembly facilitates quick and easy discharge of the cart by actuating a release. In certain embodiments, the release is manually actuated. For example, the release can be a foot lever or a hand lever.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure. Throughout the drawings, reference numbers may be re-used to indicate correspondence between referenced elements.

DETAILED DESCRIPTION OF CERTAIN EMBODIMENTS

Certain cart retrievers have connection assemblies that are inconvenient, difficult, and/or complicated to use. For example, certain connection assemblies require the manual insertion of a securing component (e.g., a pin or bolt) to secure the carts in the connection assembly. Such components require the added step of inserting the component, which can increase the total cart retrieval time. Furthermore, the securing component can be easily misplaced, in which case the ability to use the cart retriever can be reduced or eliminated. Moreover, as the securing component may be relatively small, insertion of the component can be especially difficult during cold weather, as the cart attendant is generally wearing gloves or mittens, which reduce the manual dexterity of the wearer. Additionally, should the securing component be inserted incorrectly, the carts may be improperly closed with the connection assembly, which could lead to the carts becoming unintentionally decoupled, thereby allowing the carts to move in an uncontrolled manner. Such uncontrolled movement of the carts could result in property damage or personal injury should the carts collide with objects or persons.

Some connection assemblies are not configured to conveniently disconnect from the cart. For example, some connection assemblies are not configured to encourage a spatial separation between the carts and the retriever upon opening of the connection assembly. For example, although certain connection assemblies are configured to disengage a latching mechanism or other assembly that couples the retriever and the carts, such disengagement does not encourage relative movement of the carts and the retriever. Accordingly, in certain connection assemblies, it is difficult to discern whether the retriever has been decoupled from the cart. Further, in cart retrievers with certain connection assemblies, additional maneuvering can be required to separate the carts from the retriever.

Various embodiments of a connection assembly for connecting a cart with a retriever device are disclosed that can address some or all of the foregoing disadvantages as well as other disadvantages. The present disclosure describes certain embodiments of the connection assembly in the context of wheeled retail shopping carts due to particular utility in that context. However, this presentation is for the purpose of illustration and not limitation, and embodiments of the connection assembly can be used in many other contexts as well, such as for collecting and moving luggage carts, freight carts, lumber carts, panel trucks, beds (e.g., hospital beds and other types of medical beds), and other types of non-motor-propelled wheeled devices. The connection assembly and/or components thereof can be powered or manually-driven. Some embodiments of the connection assembly are not configured to engage with wheeled devices that are on rails.

Figure 1:
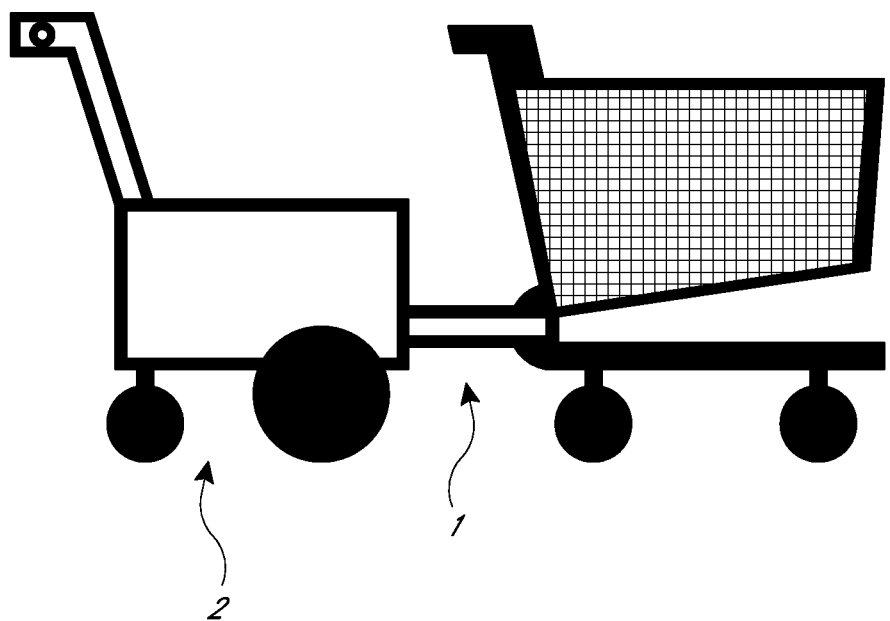
FIG. 1 is a schematic illustration of a cart retriever connected with a shopping cart via a connection assembly.
Figure 1A:
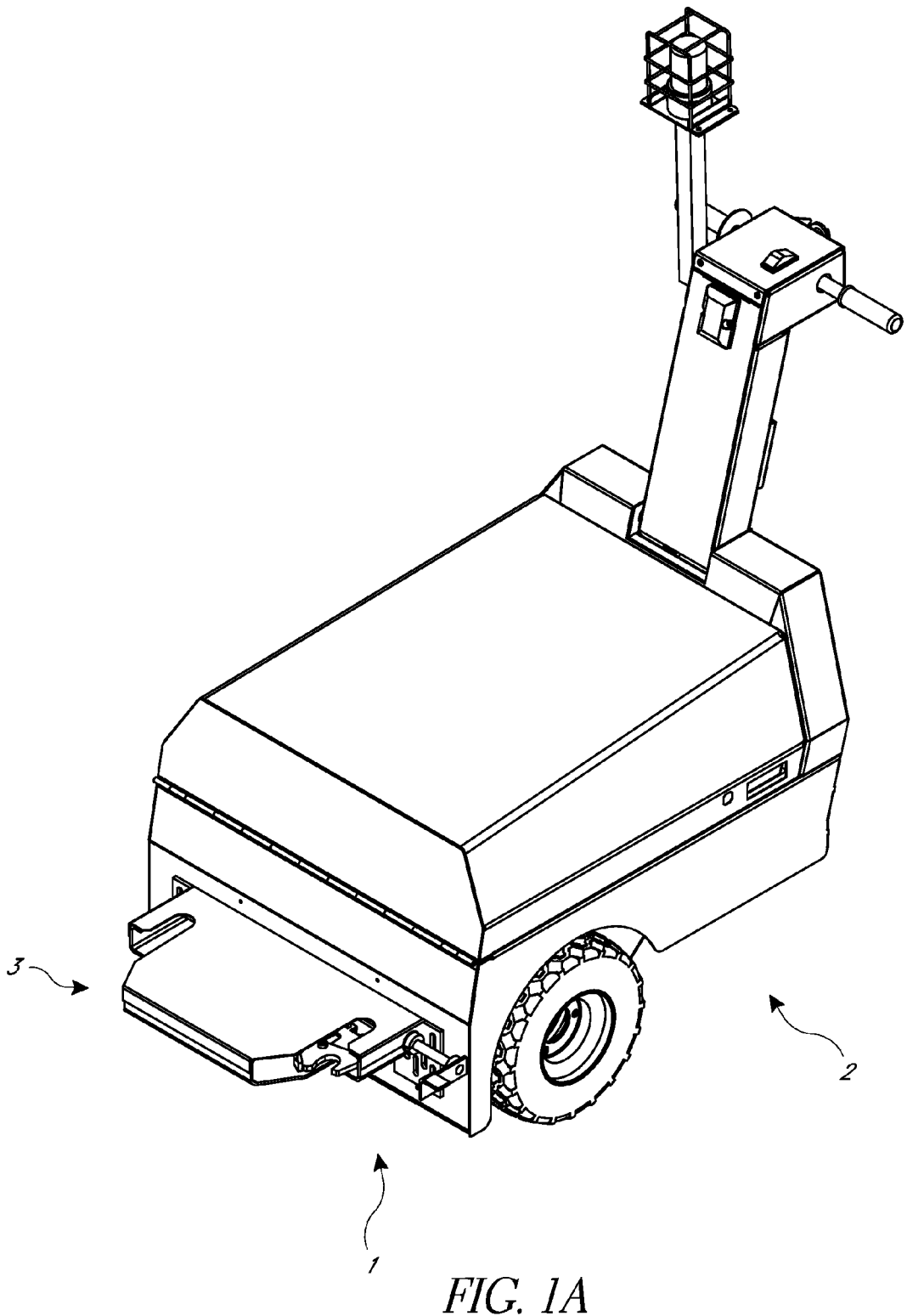
FIG. 1A illustrates a perspective view of an embodiment of a cart connection assembly and a motorized cart retriever.

With reference to FIGS. 1 and 1A, some embodiments of the connection assembly 1 are configured connect with a shopping cart and to mount to a cart retriever 2. Generally, the cart retriever 2 is a steerable self-propelled device that is configured to provide sufficient power to drive at least one nested chain of carts. For example, the cart retriever 2 may be configured to push or pull at least: 10 carts, 20 carts, or 30 carts. In certain implementations, the cart retriever 2 is configured to push or pull at least: about 500 pounds, about 1,000 pounds, or about 1,500 pounds. In some embodiments, the cart retriever 2 is non-motor-propelled (e.g., manually propelled).

In certain configurations, and as will be discussed in further detail below, a cart (e.g., a wheeled retail shopping cart) can be connected to a front of the connection assembly 1. Additional carts can be nested with the first cart, thereby providing the ability for the retriever 2 to move, via the connection assembly 1, the plurality of carts. In some embodiments, the connection assembly 1 is configured to connect with a rear portion of a frame of the cart, such as the rear legs of the cart. In some embodiments, the connection assembly 1 is configured to connect with a generally C-shaped portion of the rear portion of the cart. In some embodiments, the connection assembly 1 is configured to connect with a portion of the cart that supports a basket of the cart. In certain implementations, the connection assembly 1 is configured to connect with a generally horizontal portion of the cart, such as a generally horizontal bar or strut. In various embodiments, the rear wheels of the cart remain in contact with the ground during connection with the connection assembly 1, which can facilitate engagement and provide enhanced durability of the connection assembly 1.

Figure 2:
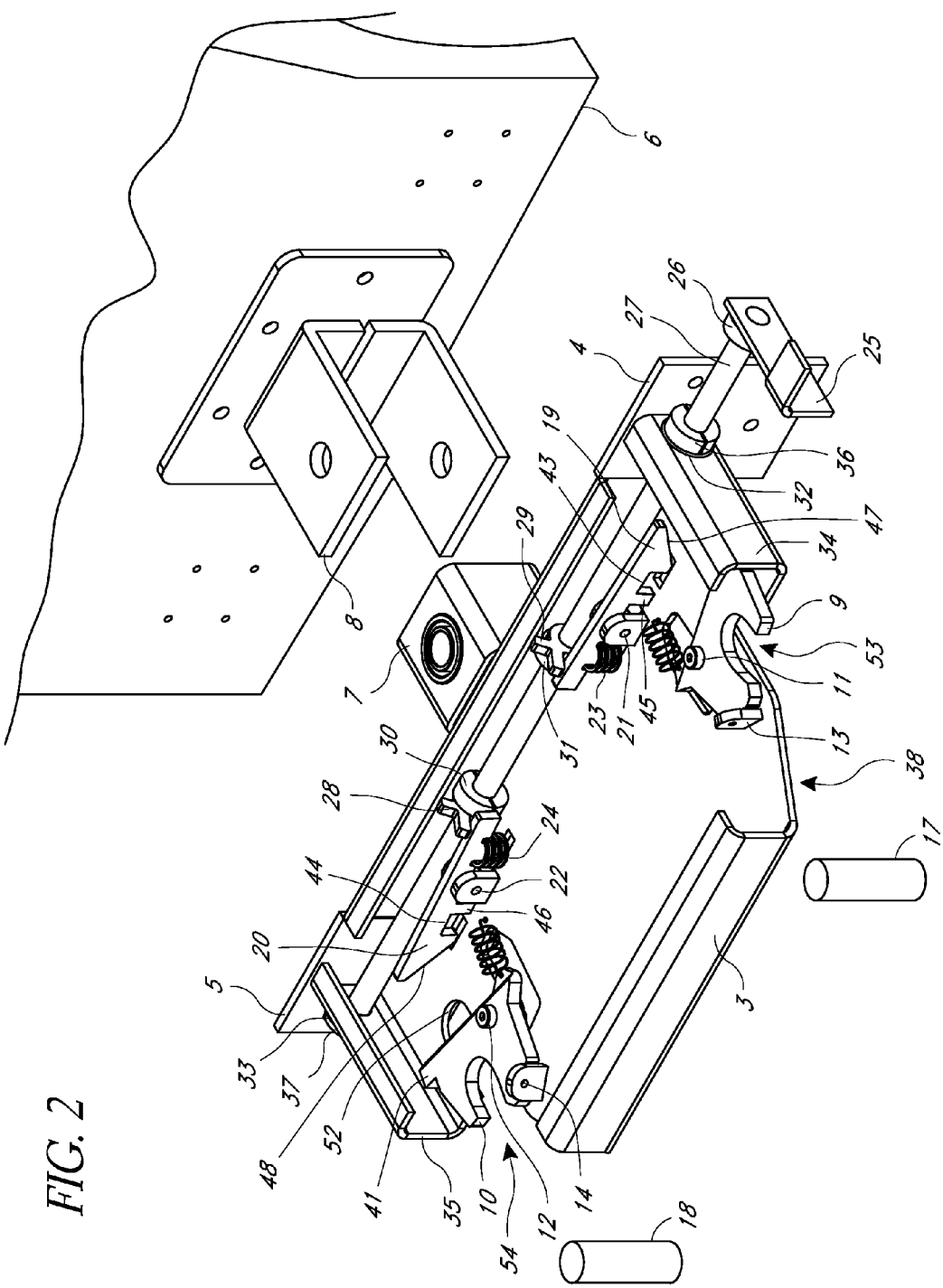
FIG. 2 illustrates a perspective view of the cart connection assembly of FIG. 1.

With regard to FIG. 2, the connection assembly 1 can include a housing 3 that is configured to mount with the cart retriever 2. For example, some embodiments include mounting plates 4, 5 that are configured to connect with a front portion 6 of the retriever 2, such as with fasteners (e.g., screws, bolts, or otherwise), by welding, or otherwise. In some embodiments, the mounting plates 4, 5 and the front portion 6 of the retriever 2 include corresponding holes or slots that are configured to receive the fasteners. Certain implementations of the housing 3 have a protective upper cover (see FIG. 1), which can protect components of the connection assembly 1 against damage. In some embodiments, the housing 3 has an angled front, which can be configured to guide portions of the cart toward components of the connection assembly 1 that are configured to secure the cart, thereby facilitating engagement.

In certain embodiments, the housing 3 is pivotally connected with the retriever 2. For example, a rear portion of the housing 3 can include a mounting arm 7 that pivotally connects with a hitch 8 of the retriever 2. A pivotal connection can facilitate steering the nested chain of carts, such as by reducing the turning radius of the retriever and the carts.

As illustrated, the housing 3 includes one or more notches 51, 52. In some embodiments, the notches 51, 52 can be positioned at generally opposite lateral sides of the housing 3. As shown, the notches 51, 52 can open toward the front of the connection assembly 1 (e.g., generally away from the retriever 2). The notches 51, 52 can be configured to receive frame members 17, 18 of a shopping cart, such as portions of the rear legs or wheels of the cart. The notches 51, 52 can be laterally spaced apart the same or approximately the same distance as the distance between the frame members 17, 18, thereby allowing the rear legs to be received in the notches 51, 52.

According to some embodiments, the connection assembly 1 includes engagement members 9, 10 that are configured to engage the frame members 17, 18. In certain implementations, the engagement members 9, 10 are generally C-shaped, though a variety of other shapes are contemplated. In some embodiments, the engagement members 9, 10 are configured to rotate around pivot members 11, 12 (e.g., bolts, pins, or otherwise), respectively, which connect with the housing 3. For example, in some embodiments, the engagement members 9, 10 rotate at least about 45° and/or equal to or less than about 120°. In some variants, the engagement members 9, 10 rotate between about 85° and about 95°. In some embodiments, at least one of the engagement members 9, 10 is configured to rotate about an axis of rotation that is generally perpendicular with the ground on which the cart retriever resides. In certain implementations, at least one of the engagement members 9, 10 is configured to rotate about an axis of rotation that is generally parallel with the ground on which the cart retriever resides. For example, in some embodiments at least one of the engagement members 9, 10 is configured to rotate so as to grab a generally horizontal bar on the shopping cart. As discussed in further detail below, the engagement members 9, 10 can be configured to rotate from an "open" (also sometimes referred to as a "first" position) position to a "closed" position (also sometimes referred to as a "second" position or a "secured" position).

In certain implementations, the engagement members 9, 10 each include a recess 53, 54 that is configured to receive the frame members 17, 18. For example, the recesses 53, 54 can comprise voids, grooves, indentations, or other features. Some embodiments have recesses 53, 54 that are generally U-shaped, though many other shapes can be employed. Various forming methods can be used to create the recesses 53, 54 engagement members 9, 10, such as molding, machining, cutting, stamping, or other forming operations.

As illustrated in FIG. 2, in some orientations of the engagement members 9, 10, the recesses 53, 54 open toward the front of the connection assembly 1 (e.g., outward and generally away from the cart retriever 2). Such a configuration is described as the "open" position of the engagement members 9, 10 because the recesses 53, 54 are configured to readily receive the frame members 17, 18 of the shopping cart. Having the recesses 53, 54 open toward the front of the connection assembly 1 (rather than, for example, the lateral sides of the assembly) is beneficial because the connection assembly 1 can be engaged with the shopping cart from the rear of the cart and generally along the front-to-rear axis of the shopping cart. Furthermore, such an arrangement can reduce or avoid the need for lateral movement of the connection assembly 1 as a whole relative to the shopping cart during engagement, thereby avoiding the additional steps and time entailed in such operations. In some embodiments, when the engagement members 9, 10 are in the open position, the openings of the recesses 53, 54 are substantially unimpeded, thereby facilitating movement of the frame members 17, 18 into the recesses 53, 54. In certain implementations, when the engagement members 9, 10 are in the open position, the recesses 53, 54 are generally aligned with the notches 51, 52. For example, in some embodiments, the frame members 17, 18 can be substantially unimpededly and concurrently received in the notches 51, 52 and the recesses 53, 54.

In some embodiments, when the engagement members 9, 10 are in the open position, the recesses 53, 54 and the notches 51, 52 are configured such that the frame members 17, 18 can be engaged therein substantially without impediment. For example, certain embodiments of the recesses 53, 54 and the notches 51, 52 do not have a jaw, door, or other type of obstruction that must be displaced to allow the frame members 17, 18 to enter into the recesses 53, 54. Facilitating substantially uninhibited engagement of the recesses 53, 54 and the frame members 17, 18 can, for example, reduce the amount of force required to accomplish the engagement. For example, some embodiments of the connection assembly 1 can avoid the need to apply an initial force in order to accomplish engagement, unlike devices having jaws or the like that are biased closed and which must be overcome with an initial application of force to engage with the cart. In some embodiments, the engagement members 9, 10 can remain stationary when the recesses 53, 54 receive the frame members 17, 18. In some embodiments, the engagement members 9, 10 are configured to rotate after recesses 53, 54 receive the frame members 17, 18, such rotation thereby securing the frame members 17, 18 in the connection assembly 1.

In certain implementations, the engagement members 9, 10 are biased by biasing elements 15, 16, such as springs. FIG. 2 illustrates the biasing elements 15, 16 as extension springs with one end anchored at the engagement members 9, 10 and the other end anchored at the housing 3. Of course, various other biasing elements and configurations can be used, such as torsion springs mounted around the pivot members 11, 12. In some embodiments, the biasing elements 15, 16 bias the engagement members 9, 10 generally toward the open position (e.g., the position shown in FIG. 2). As such, the biasing elements 15, 16 can bias against rotation of the engagement members 9, 10 away from the open position. For example, the biasing elements 15, 16 can bias against counterclockwise rotation of the engagement member 9 and clockwise rotation of the engagement member 10, from the perspective illustrated in of FIG. 2. In some embodiments, the housing 3 includes stops 13, 14 that define the extent of rotation of the engagement members 9, 10 (e.g., the extent of clockwise rotation of the engagement member 9 and counterclockwise rotation of the engagement member 10). In some embodiments, the stops 13, 14 inhibit or prevent the engagement members 9, 10 from rotating beyond the open position.

According to some embodiments, the connection assembly 1 includes latches 19, 20. The latches 19, 20 can be configured to pivot about pivot pins 21, 22, respectively. In some embodiments, the latches 19, 20 include cam elements 47, 48. As shown, the cam elements 47, 48 can be directed generally laterally outward and/or away from each other. In some embodiments, slots 43, 44 are positioned between the cam elements 47, 48 and protrusions 45, 46.

In various embodiments, during engagement of the connection assembly 1 with the shopping cart, the cart connection assembly 1 is moved toward the rear of the cart and the recesses 53, 54 of the engagement members 9, 10 are aligned with the frame members 17, 18. The cart connection assembly 1 is moved relative to the cart such that the frame members 17, 18 are received in the recesses 53, 54. Further, such movement of the connection assembly 1 relative to the cart engages the frame members 17, 18 and the engagement members 9, 10. For example, the frame members 17, 18 can be brought into contact with rearward portions of the recesses 53, 54. Additional movement of the connection assembly 1 relative to the cart can encourage rotation of the engagement members 9, 10 against the bias of the biasing elements 15, 16.

In certain embodiments, sufficient rotation of the engagement members 9, 10 brings the engagement members 9, 10 into engagement with the cam elements 47, 48 of the latches 19, 20. Further rotation of the engagement members 9, 10 can result in an interference between the cam elements 47, 48 and the engagement members 19, 20, which can displace (e.g., vertically) the cam elements 47, 48. In some embodiments, displacement of the cam elements 47, 48 results in the latches 19, 20 being rotated about the pivot pins 21, 22. In some implementations, latch biasing elements 23, 24, such as coil springs, act against such rotation of the cam elements 47, 48. In certain configurations, the protrusions 45, 46 act as a stop against the housing 3, thereby preventing further pivotal movement of the latches 19, 20 (e.g., clockwise movement of the latch 19 and counterclockwise movement of the latch 20, from the perspective of FIG. 2).

Figure 3:
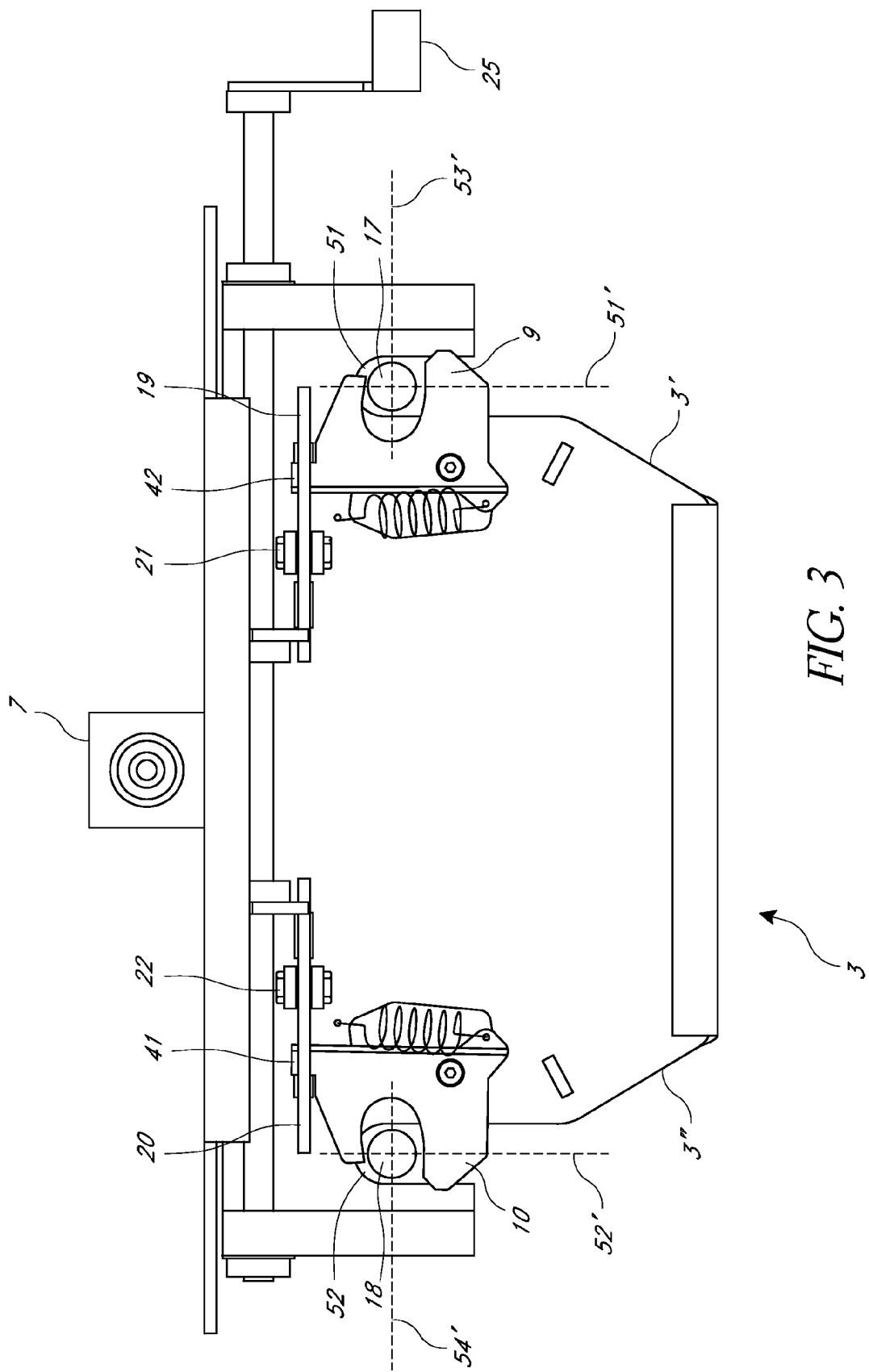
FIG. 3 illustrates a top view of the cart connection assembly of FIG. 1.

With regard to FIG. 3, further rotation of the engagement members 9, 10 can result in flanges 41, 42 of the engagement members 19, 20 being rotated into the slots 43, 44 of the latches 19, 20. For example, the flanges 41, 42 can rotate laterally inward of the cam elements 47, 48. In such configurations, as the interference between the cam elements 47, 48 and the engagement members 19, 20 is no longer present, the latch biasing elements 23, 24 can return the latches 19, 20 to their original position, thereby securing the flanges 41, 42 in the slots 43, 44 and retaining the engagement members 9, 10 in the rotated position (e.g., as shown in FIG. 3). Such a configuration is described as the "closed" position of the engagement members 9, 10.

In certain implementations, when the connection assembly 1 is engaged with a shopping cart and the engagement members 9, 10 are in the closed position, the frame members 17, 18 of the cart are secured with regard to the connection assembly 1. Such a configuration can facilitate pushing or pulling the first cart (or a chain of carts nested or otherwise connected with the first cart) with the connection assembly 1 and cart retriever 2. In some embodiments, the frame members 17, 18 are secured by the housing 3 and the engagement members 9, 10. For example, as illustrated in FIG. 3, a portion of the frame members 17, 18 can be received in the recesses 53, 54 and the notches 51, 52 and can be generally surrounded by the combination of the housing 3 and the respective engagement member 9, 10. In some embodiments, after the connection assembly 1 is engaged with the shopping cart, additional carts can be nested with the shopping cart, thereby allowing movement of the nested chain of carts with the cart retriever. In certain implementations, the connection assembly 1 can be engaged with the rearmost shopping cart of a line of nested shopping carts. In certain implementations, the connection assembly 1 does not engage wheels that are connected with the frame members 17, 18.

In some embodiments, the shopping cart is secured to the connection assembly 1 automatically upon engagement of the frame members 17, 18 in the recesses 53, 54 and the notches 51, 52 and movement of the connection assembly 1 toward the front of the shopping cart. Used herein, the term "automatically" refers to a mechanism or process that occurs in the course of normal usage of the connection assembly 1 and does not require an additional step or manipulation by the cart retriever 2 and/or the operator of the cart retriever 2. For example, in some embodiments, receipt of the frame members 17, 18 in the recesses 53, 54 and the notches 51, 52 and movement of the connection assembly 1 relative to the cart is all that is needed to rotate the engagement members 9, 10 to the closed position. Automatic engagement of the frame members 17, 18 with the engagement members 9, 10 can thus provide a secure connection without the need for supplemental steps or operations, such as manually inserting pins or bolts, to secure the shopping cart.

In some embodiments, the recesses 53, 54 each include a recess axis 53', 54', respectively, and the notches 51, 52 each include a notch axis 51', 52', respectively, thereby providing a visual confirmation of the engagement and/or enhancing the strength of the connection between the cart and the connection assembly 1. In some embodiments, the recess axis 53' and the notch axis 51' are generally parallel and the recess axis 54' and the notch axis 52' are generally parallel when the engagement members 9, 10 are in the open position. As shown in FIG. 3, in certain embodiments, the recess axis 53' and the notch axis 51' are generally perpendicular and the recess axis 54' and the notch axis 52' are generally perpendicular when the engagement members 9, 10 are in the closed position.

In some situations, such as after the shopping cart (or line of nested shopping carts) has been moved to a desired location, it may be desirable to disengage the cart from the connection assembly 1. Thus, the connection assembly 1 can include a disengagement feature, such as a release 25. As will be discussed in further detail below, some embodiments of the release 25 are configured to release the flanges 41, 42 from the slots 43, 44, thereby allowing the engagement members 9, 10 to rotate toward their open position and releasing the cart from the connection assembly 1. In certain arrangements, the release 25 is manually actuated, such as by a hand or foot. In other configurations, the release 25 is motorized. For example, in certain embodiments, the release 25 is operated by an electric, hydraulic, or pneumatic motor.

In some embodiments, the release 25 is coupled with a shaft 27. As shown, the shaft 27 can protrude outwardly from the connection assembly 1 to facilitate ready access (e.g., by an operator's foot) to the release 25. In other embodiments, the release 25 is positioned generally within an outer periphery of the housing 3, thereby protecting the release 25 from damage. Certain embodiments of the shaft 27 extend generally across the lateral width of the connection assembly 1. In some implementations, the release 25 is coupled to a portion of a collar 26, which can be clamped to the shaft 27. In certain embodiments, the shaft 27 is supported by one or more bushing 32, 33 connected with vertical flanges 34, 35 of the housing 3. Some implementations include collar clamps 36, 37 that support the shaft 27 and/or inhibit longitudinal movement of the shaft 27. In some implementations, the shaft 27 is coupled with latch releases 28, 29. For example, the latch releases 28, 29 can be welded or otherwise bonded to shaft collars 30, 31, which in turn are connected (e.g., clamped) to the shaft 27.

In some embodiments, the lever 25 is movable between non-actuated and actuated positions. In some embodiments, the lever 25 and/or shaft 27 is biased, such as by a torsion spring, toward the non-actuated position. In various embodiments, the lever 25 is configured such that actuating (e.g., pressing downward) on the lever 25 rotates the shaft 27, which in turn rotate the latch releases 28, 29. In certain embodiments, when the latch releases 28, 29 are rotated they engage (e.g., contact) the latches 19, 20. For example, the rotation of the latch releases 28, 29 can encourage an inner end portion of the latches 19, 20 downward, thereby pivoting the latches 19, 20 about the pivot pins 21, 22 and displacing the opposite ends of the latches 19, 20 vertically. In some configurations, such displacement of the latches 19, 20 can disengage the flanges 41, 42 from the slots 43, 44, thereby allowing the biasing elements 15, 16 to rotate the engagement members 9, 10 toward the open position.

In certain embodiments, when the engagement members 9, 10 are at or near the open position, the frame members 17, 18 of the cart can be disengaged from the connection assembly 1. For example, as the engagement members 9, 10 rotate toward the open position, the frame members 17, 18 can be removed from the recesses 53, 54 of the engagement members and the notches 51, 52 of the housing 3. In some implementations, the biasing elements 15, 16 rotate the engagement members 9, 10 with sufficient force to facilitate separation of the frame members 17, 18 of the cart from the connection assembly 1. Such a configuration can, for example, provide an automatic ejection of the cart from the connection assembly 1. After the cart has been separated from the connection assembly 1, the connection assembly 1A is prepared to receive and secure the frame members 17, 18 of another cart.

FIGS. 4-14 illustrate another embodiment of a cart connection assembly 1A. Several components of the connection assembly 1A are similar or identical to corresponding components of the connection assembly 1 illustrated in FIG. 1. Some of these corresponding components are identified with the same reference numeral, except that an "A" has been added thereto.

In some implementations, the connection assembly 1A includes a housing 3A that is configured to adjust in lateral width. For example, some embodiments of the housing 3A are separated into a plurality of portions, such as a first housing portion 3A' and second housing portion 3A", each with a protective upper cover. The housing portions 3A', 3A" can each be configured to engage with a support member 70A, which is configured to mount with a cart retriever 1A (not shown). The support member 70A can include features to allow the housing portions 3A', 3A" to slide laterally relative to the support member 70A and/or to each other. Such lateral movement of the housing portions 3A', 3A" can allow adjustment of the connection assembly 1 to fit a variety of shopping cart widths and configurations.

In some embodiments, the support member 70A includes a channel 72A and the housing portions 3A', 3A" include first engagement features 76A, 78A that are configured to engage and slide along the channel 72A. In some embodiments, the support member 70A includes a second channel 74A and the housing portions 3A', 3A" include second engagement features 80A, 82A that are configured to engage and slide along the second channel 74A. In certain implementations, the engagement features of the housing portions 3A' are coupled with a first support plate 84A and the engagement features of the housing portions 3A" are coupled with a second support plate 86A. In certain implementations, the support plates 84A, 86A can provide enhanced rigidity and can decrease the chance of misalignment of the engagement features 76A-82A with their respective channels 72A, 74A.

Figure 4:
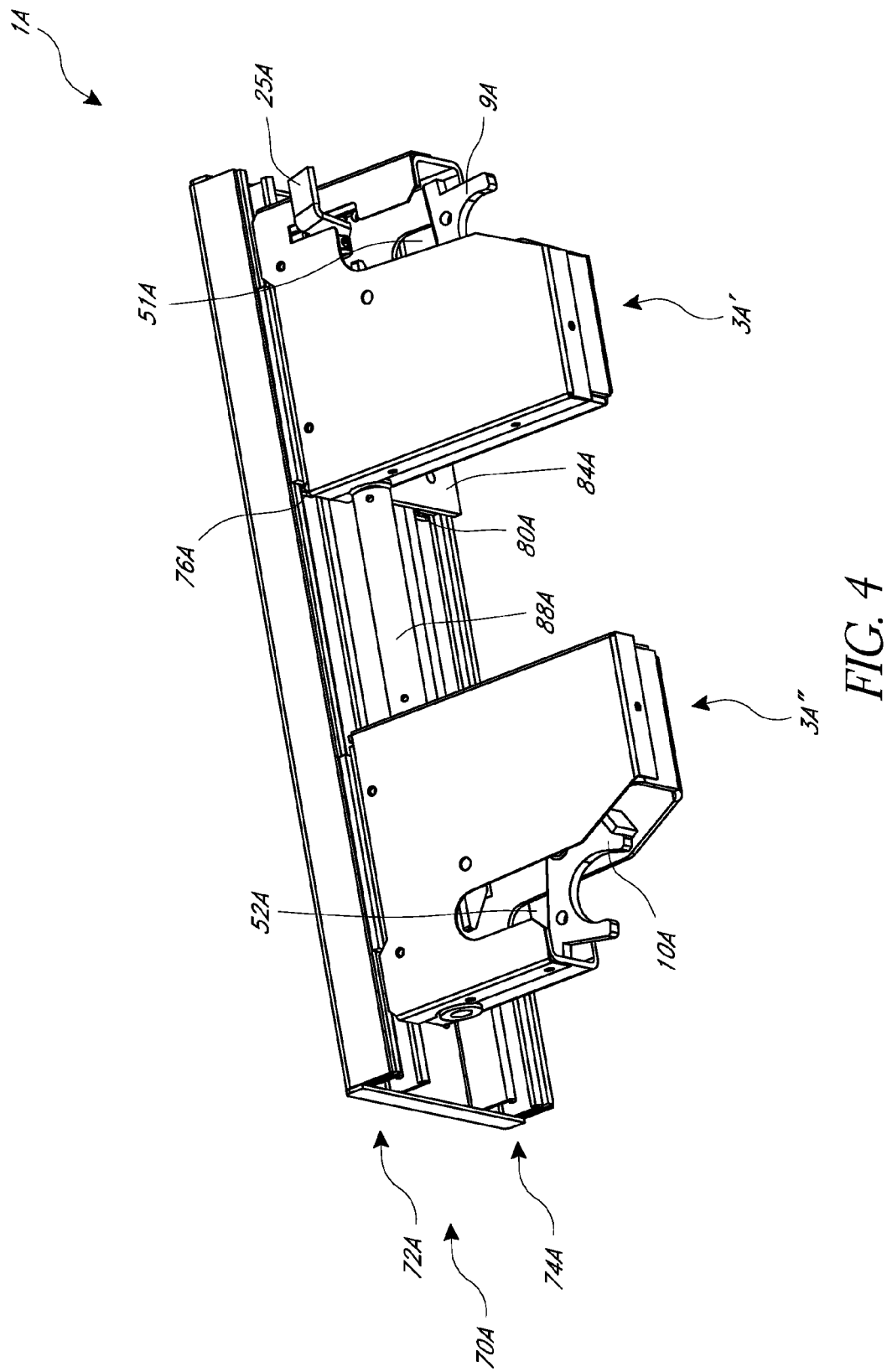
FIG. 4 illustrates a perspective view of another embodiment of a cart connection assembly, including a sheath positioned between a first housing portion and a second housing portion.
Figure 4A:
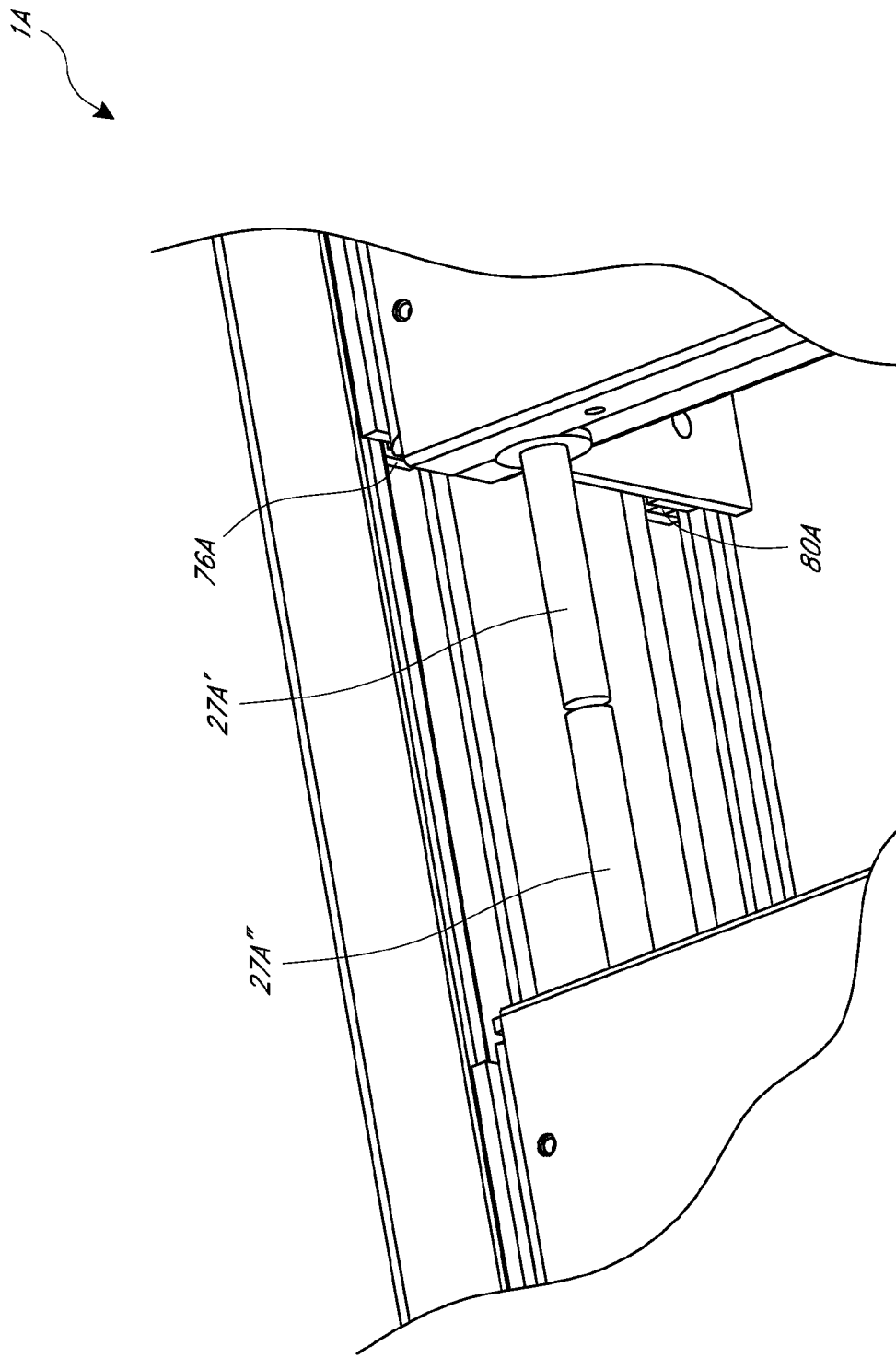
FIG. 4A illustrates a focused perspective view of a portion of the cart connection assembly of FIG. 4A, with the sheath not shown for clarity.
Figure 5:
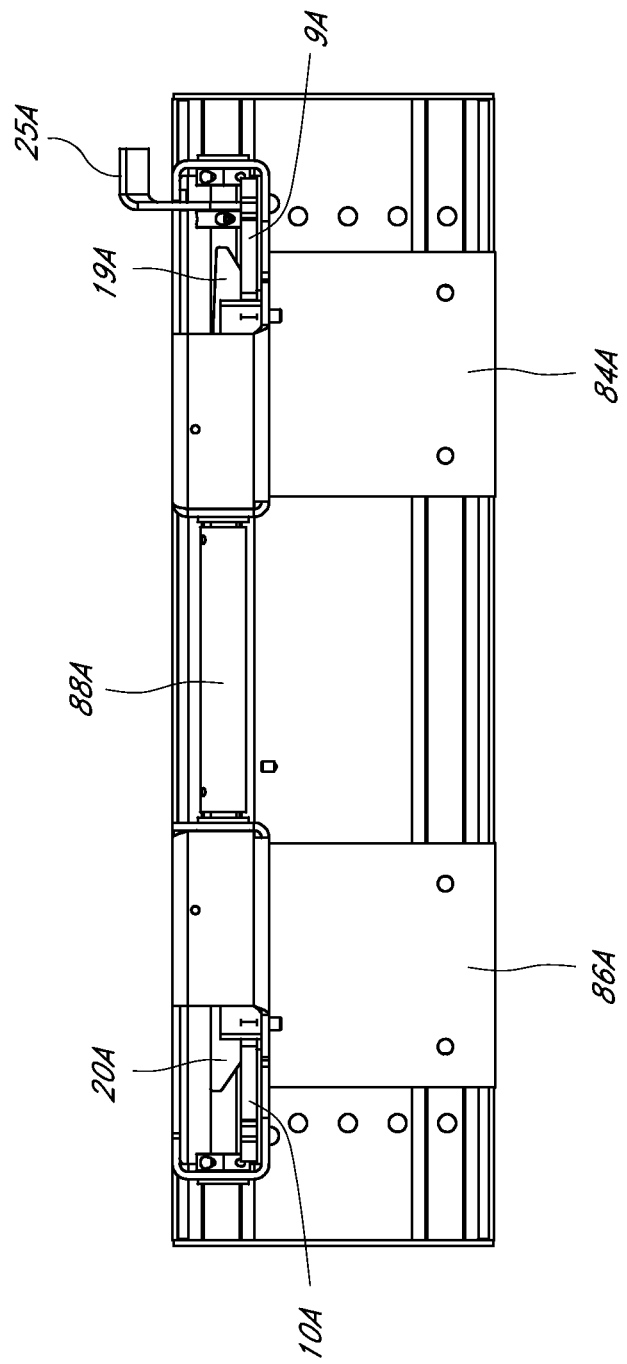
FIG. 5 illustrates a front view of the cart connection assembly of FIG. 4.
Figure 6:
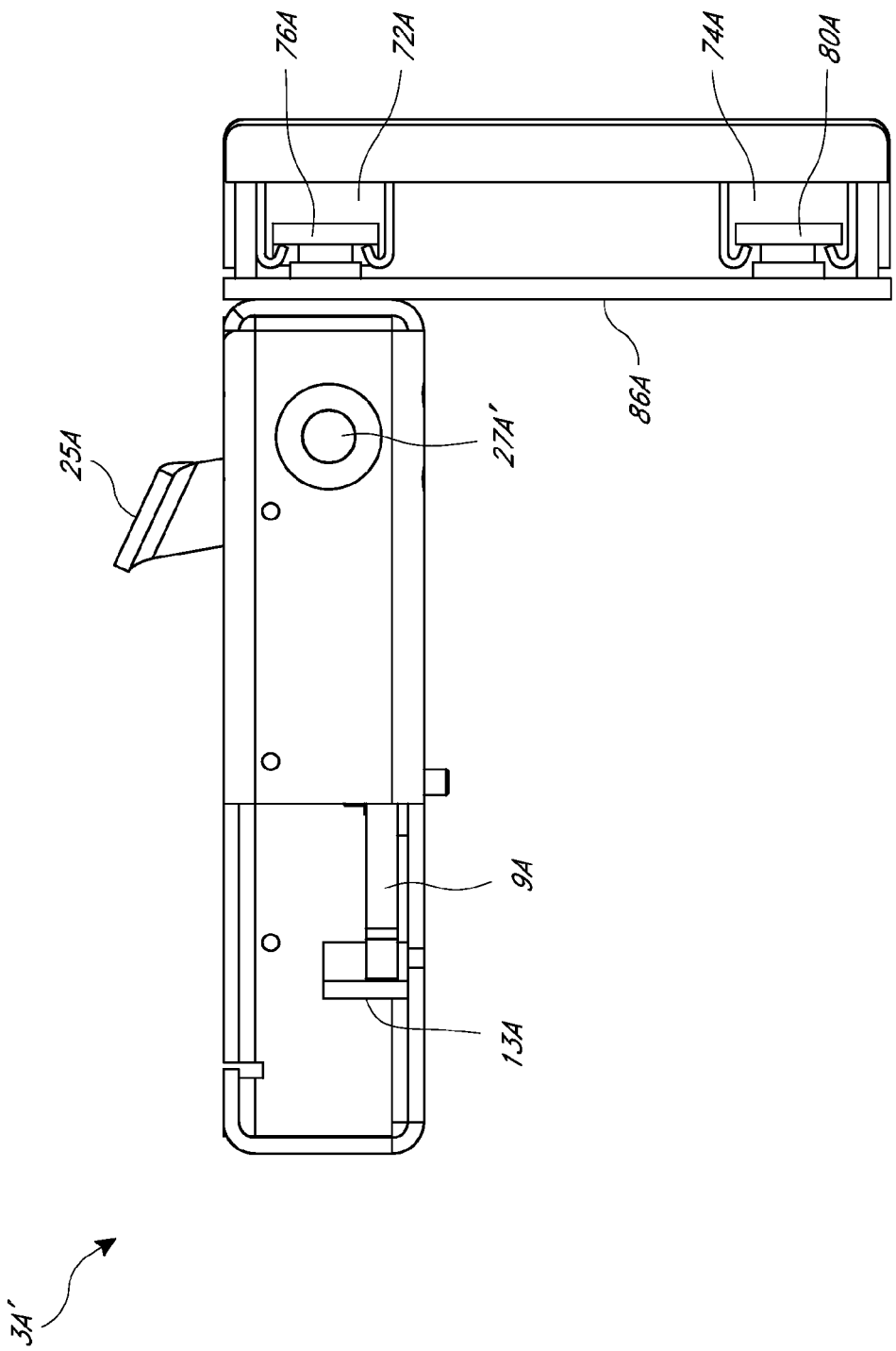
FIG. 6 illustrates a side view of the cart connection assembly of FIG. 4.
Figure 7:
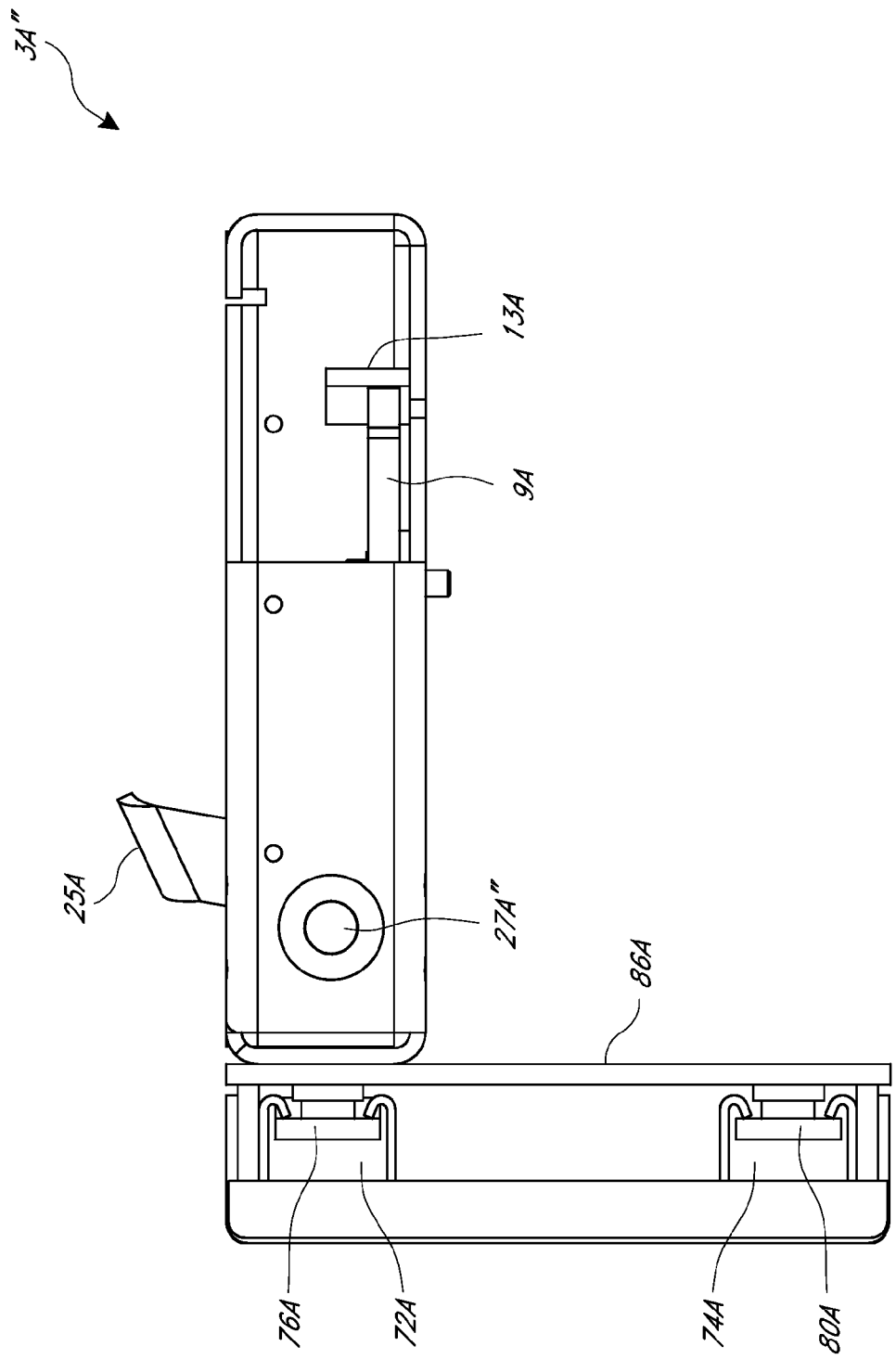
FIG. 7 illustrates another side view of the cart connection assembly of FIG. 4.
Figure 8:
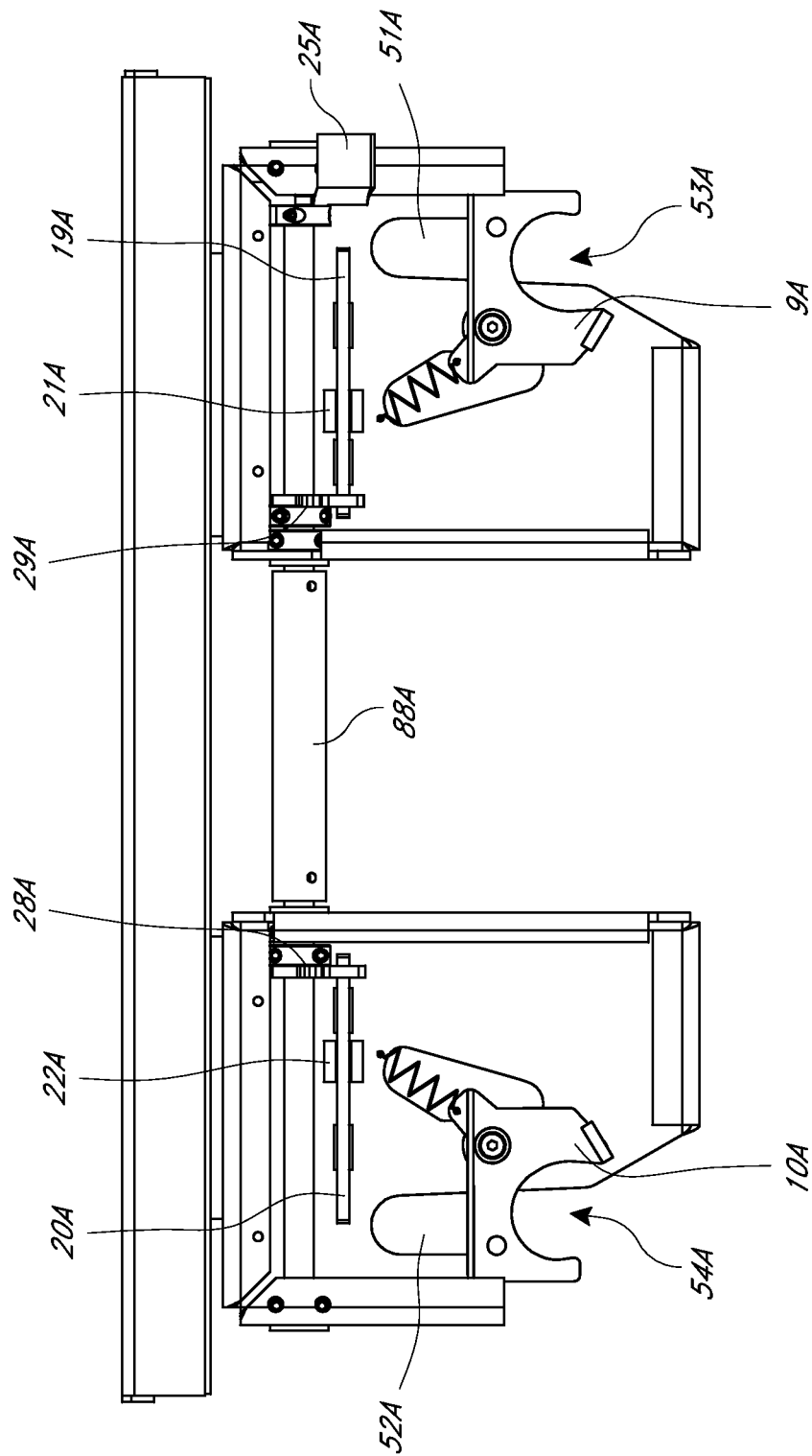
FIG. 8 illustrates a top view of the cart connection assembly of FIG. 4.

With regard to FIG. 4A, in some embodiments, the housing portion 3A' can include a shaft portion 27A' and the housing portion 3A" can include a shaft portion 27A". As shown, the shaft portions 27A', 27A" can be distinct (e.g., separate) from each other, thereby allowing the housing portions 3A', 3A" to be moved relative to each other. In certain embodiments, the shaft portions 27A', 27A" are releasably coupled via a hollow or partially hollow sheath 88A (see FIG. 4), which is not shown in FIG. 4A for clarity. For example, the shaft portions 27A', 27A" can each couple with the sheath 88A by a fastener, such as a set-screw, thereby allowing the shaft portions 27A', 27A" to be decoupled (e.g., to adjust the relative positioning of the housing portions 3A', 3A") by loosening the fastener. Such a configuration can provide protection to the shaft portions 27A', 27A" while also facilitating quick and easy positional adjustments of the housing portions 3A', 3A" to account for a variety of shopping cart sizes.

As shown in FIGS. 4-8, the connection assembly 1A includes engagement members 9A, 10A. The engagement member 9A includes a recess 53A and the engagement member 10A includes a recess 54A. Similarly, the housing portion 3A' includes a notch 51A and the housing portion 3A" includes a notch 52A. Similar to the recesses and notches described above, the recesses 9A, 10A and the notches 53A, 54A are configured to receive the frame members 17, 18 of the shopping cart.

The connection assembly 1A can also include latch members 19A, 20A. The latches 19A, 20A can be configured to pivot about pivot pins 21A, 22A, respectively. In some embodiments, the latches 19A, 20A include cam elements 47A, 48A. Certain implementations have cam elements 47A, 48A that are oriented generally laterally outward and/or away from each other. In some embodiments, slots 43A, 44A are positioned between the cam elements 47A, 48A and protrusions 45A, 46A.

Figure 9:
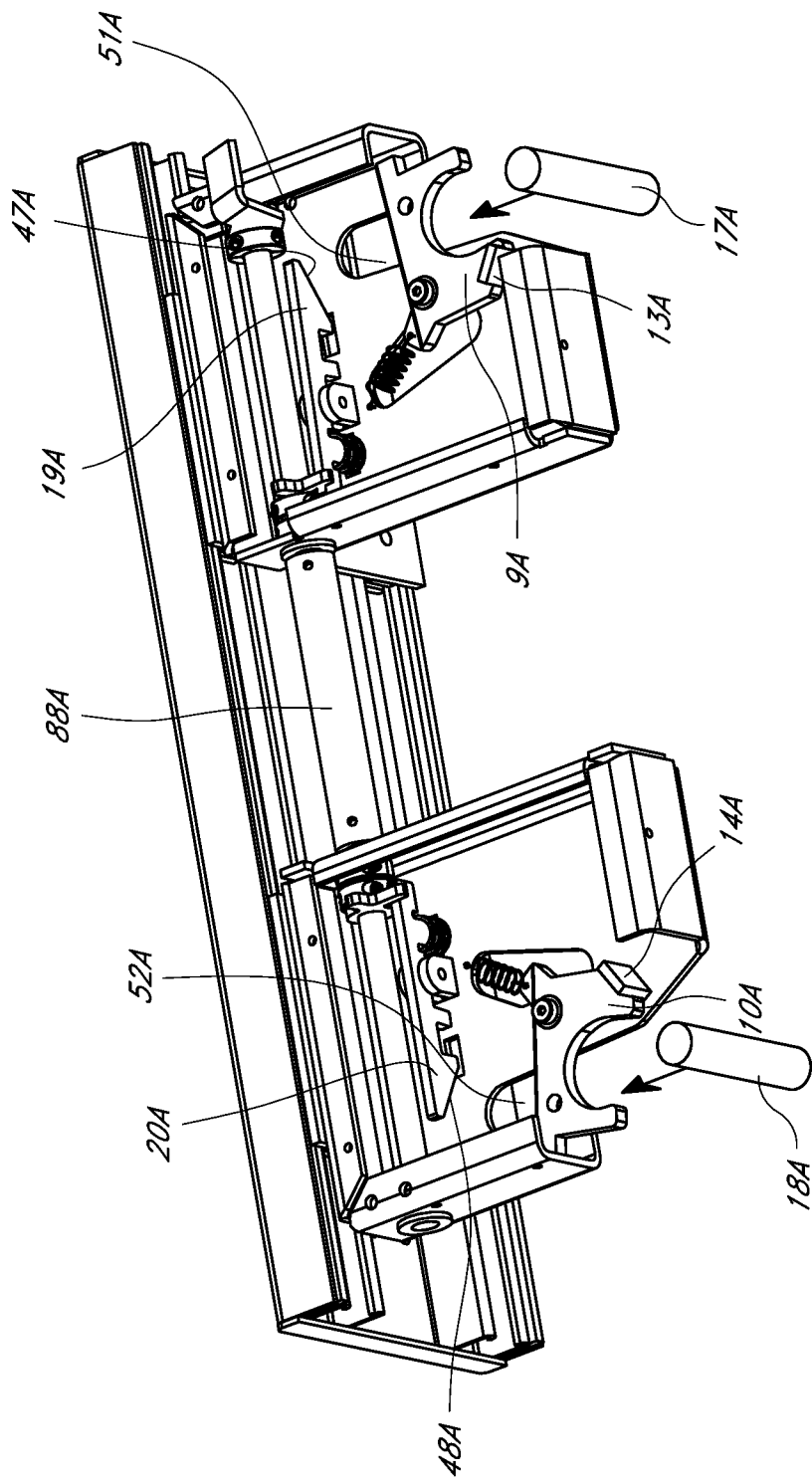
FIG. 9 illustrates a perspective view of the cart connection assembly of FIG. 4 in an open position.

With reference to FIGS. 9-14, a sequence of operation of the connection assembly 1A is illustrated. For clarity, the protective covers of the housing portions 9A, 10A are not shown in these figures. FIG. 9 illustrates the connection assembly 1 in an open position and ready to engage with the frame members 17, 18 of the shopping cart. As shown, the engagement members 9, 10 are oriented such that the recesses 53A, 54A are generally facing the front of the assembly 1. In some embodiments, the recesses 53A, 54A are generally aligned with the notches 51A, 52A, such that the frame member 17 can be received in both the recess 53A and the notch 51A, and the frame member 18 can be received in both the recess 54A and the notch 52A.

Figure 10:
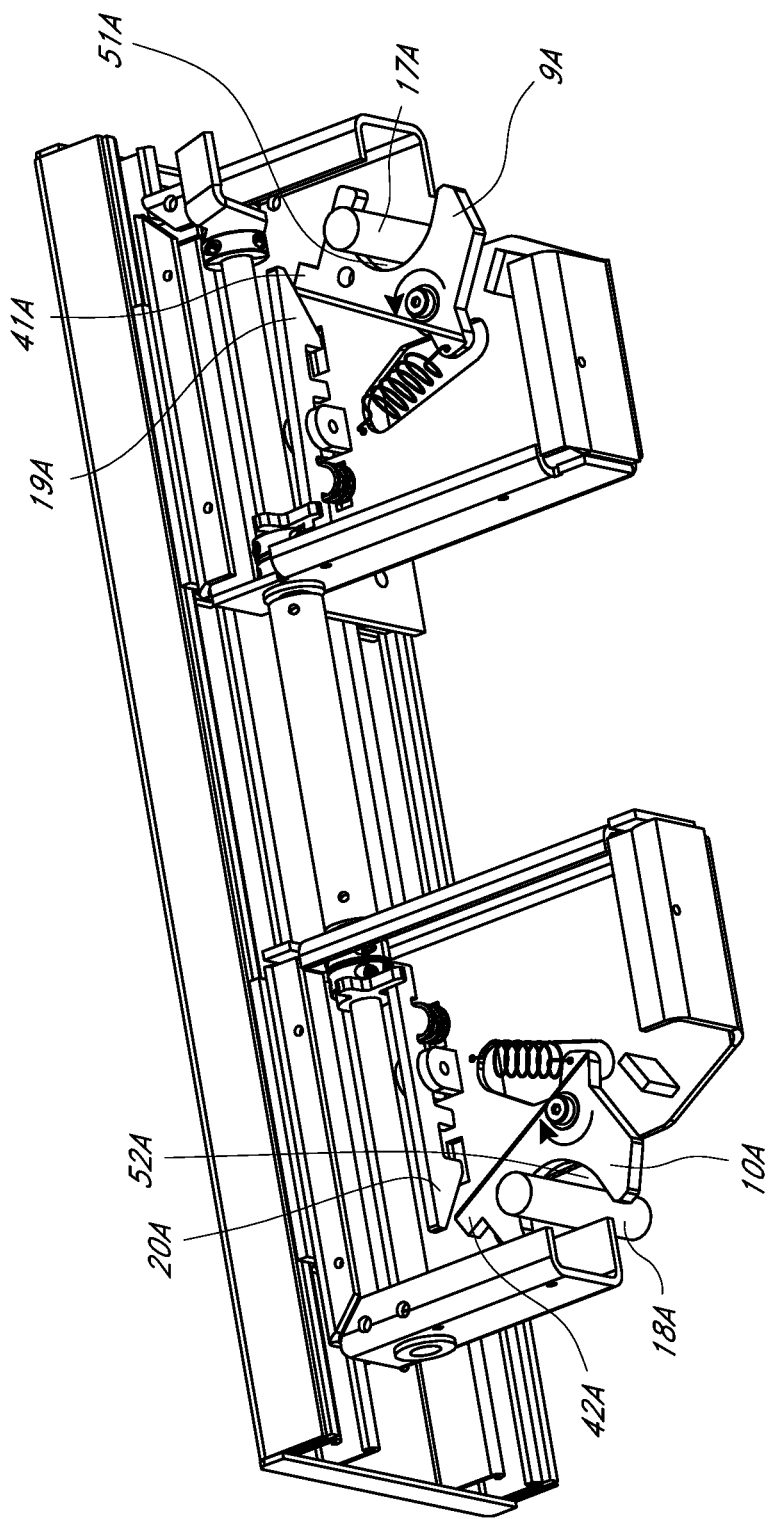
FIG. 10 illustrates a perspective view of the cart connection assembly of FIG. 4 in a partially retracted position.
Figure 11:
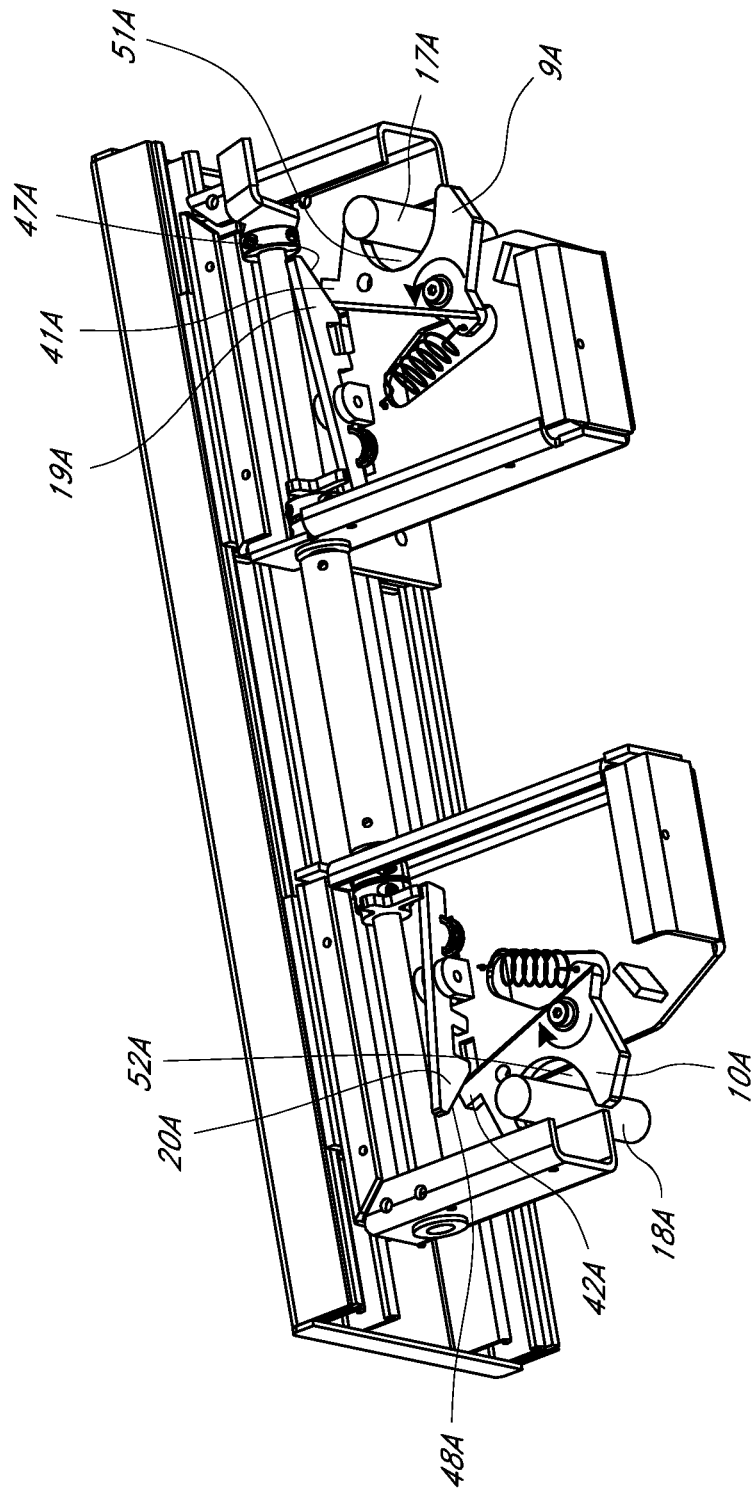
FIG. 11 illustrates a perspective view of the cart connection assembly of FIG. 4 in a further retracted position.

As shown in FIG. 10, further engagement of the frame members 17, 18 into the connection assembly 1 results in the engagement members 9, 10 rotating rearwardly (e.g., toward the support member 70A). As shown in FIG. 11, yet further engagement of the frame members 17, 18 into the connection assembly 1 can cause a flange 41A of the engagement member 9 to engage the cam element 47A of the latch 19A, and a flange 42A of the engagement member 10 to engage the cam element 48A of the latch 20A. In certain variants, such engagement displaces the cam elements 47A, 48A, thereby rotating the latches 19A, 20A. In some embodiments, the rotation of the latches 19A, 20A acts against the bias of latch biasing elements 23A, 24A.

Figure 12:
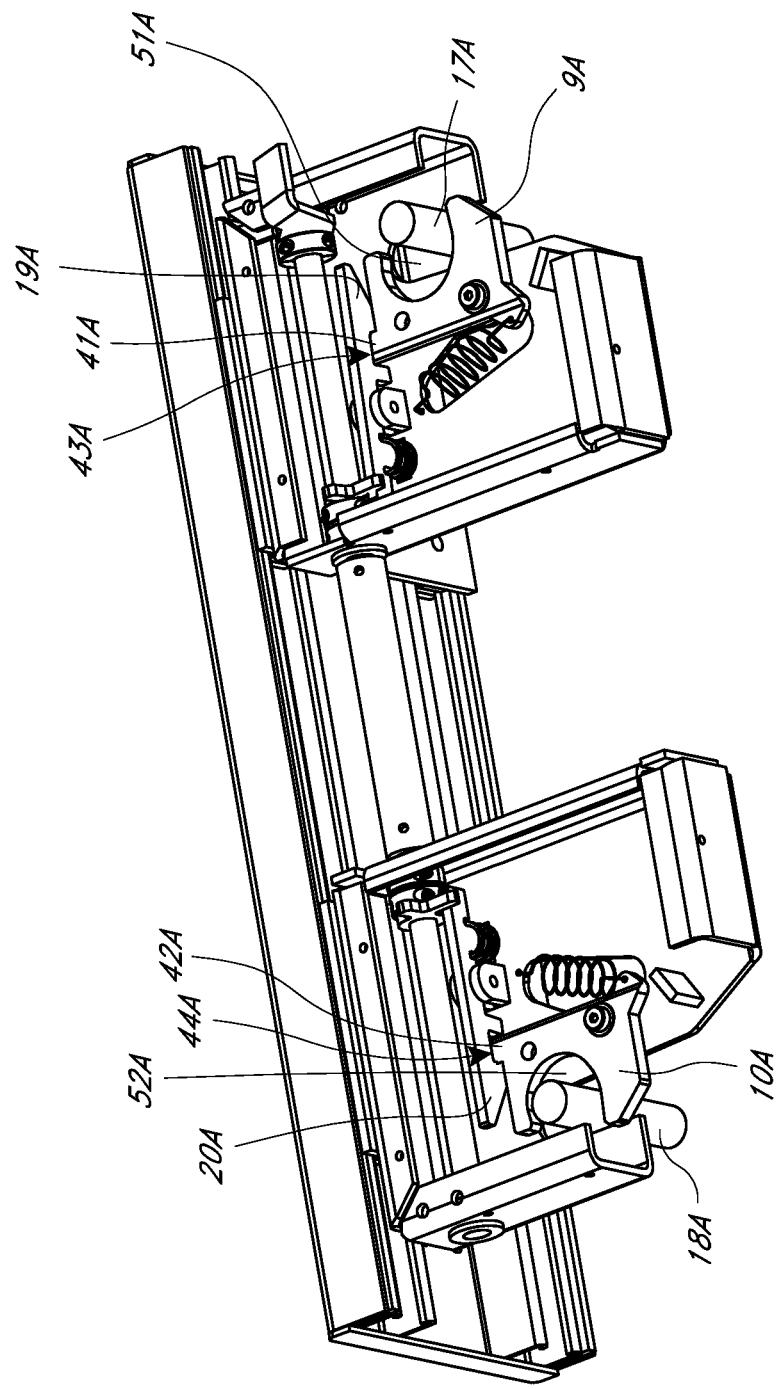
FIG. 12 illustrates a perspective view of the cart connection assembly of FIG. 4 in a closed position.

With reference to FIG. 12, still further engagement of the frame members 17, 18 into the connection assembly 1 can result in the flange 41A of the engagement member 9A being received in the slot 43A of the latch 19A and the flange 42A of the engagement member 10A being received in the slot 44A of the latch 20A. As such, the latches 19A, 20A can be returned to their original position by the biasing elements 23A, 24A, thereby securing the flanges 41A, 42A in the slots 43A, 44A. As shown, in the closed position of the engagement members 9, 10, the frame members 17, 18 are inhibited or prevented from disengaging from the connection assembly 1, thereby permitting the connection assembly 1 and the cart retriever 2 to control and transport the shopping cart (which may be nested with one or more additional shopping carts) to a desired location and orientation.

Figure 13:
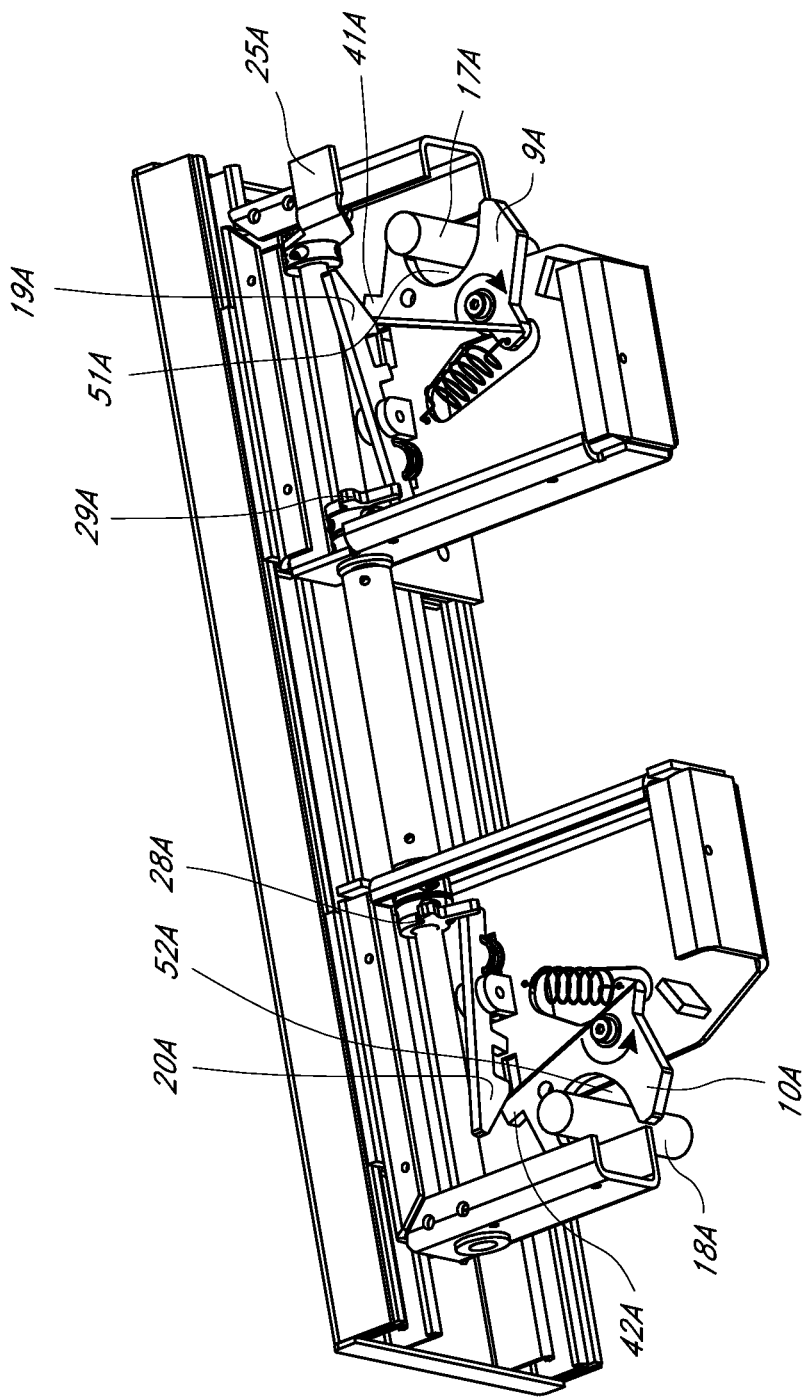
FIG. 13 illustrates a perspective view of the cart connection assembly of FIG. 4 in an expanded retracted position.

With regard to FIG. 13, in some embodiments, the connection assembly 1A includes a release 25A that connects with the shaft portion 27A'. Certain variants have the release 25 positioned generally within an outer periphery of the housing portion 3A' (when viewed from above, such as in FIG. 8), thereby protecting the lever 25 from damage. In some embodiments, the release 25 connects with the shaft portion 27A' within the outer periphery of the housing portion 3A'. As shown, the shaft portion 27A' can also couple with a latch release 29A. Additionally, as described above, the shaft portion 27A' can couple with the shaft portion 27A" via the sheath 88A. The shaft portion 27A" can couple with another latch release 28A. In certain implementation, actuation of (e.g., depressing) the lever 25A rotates the shaft portions 27A', 27A", sheath 88A, and latch releases 28A, 29A.

In certain embodiments, rotation of the latch releases 28A, 29A results in the latch releases 28A, 29A engaging (e.g., contacting) the latches 19A, 20A. For example, as shown, the latch release 28A can be configured to engage the latch 19A and the latch release 29A can be configured to engage the latch 20A. In certain embodiments, such engagement of the latch releases 28A, 29A and the latches 19A, 20A can encourage an inner end portion of the latches 19A, 20A downward, thereby pivoting the latches 19A, 20A about the pivot pins 21A, 22A and displacing the opposite ends of the latches 19A, 20A (e.g., vertically). In some configurations, such displacement of the latches 19A, 20A can disengage the flanges 41A, 42A from the slots 43A, 44A, thereby allowing the biasing elements 15A, 16A to rotate the engagement members 9A, 10A toward their respective open position. In some embodiments, the engagement members 9, 10 rotate into engagement with stops 13A, 14A, which can inhibit the engagement members 9, 10 from rotating beyond the open position.

Figure 14:
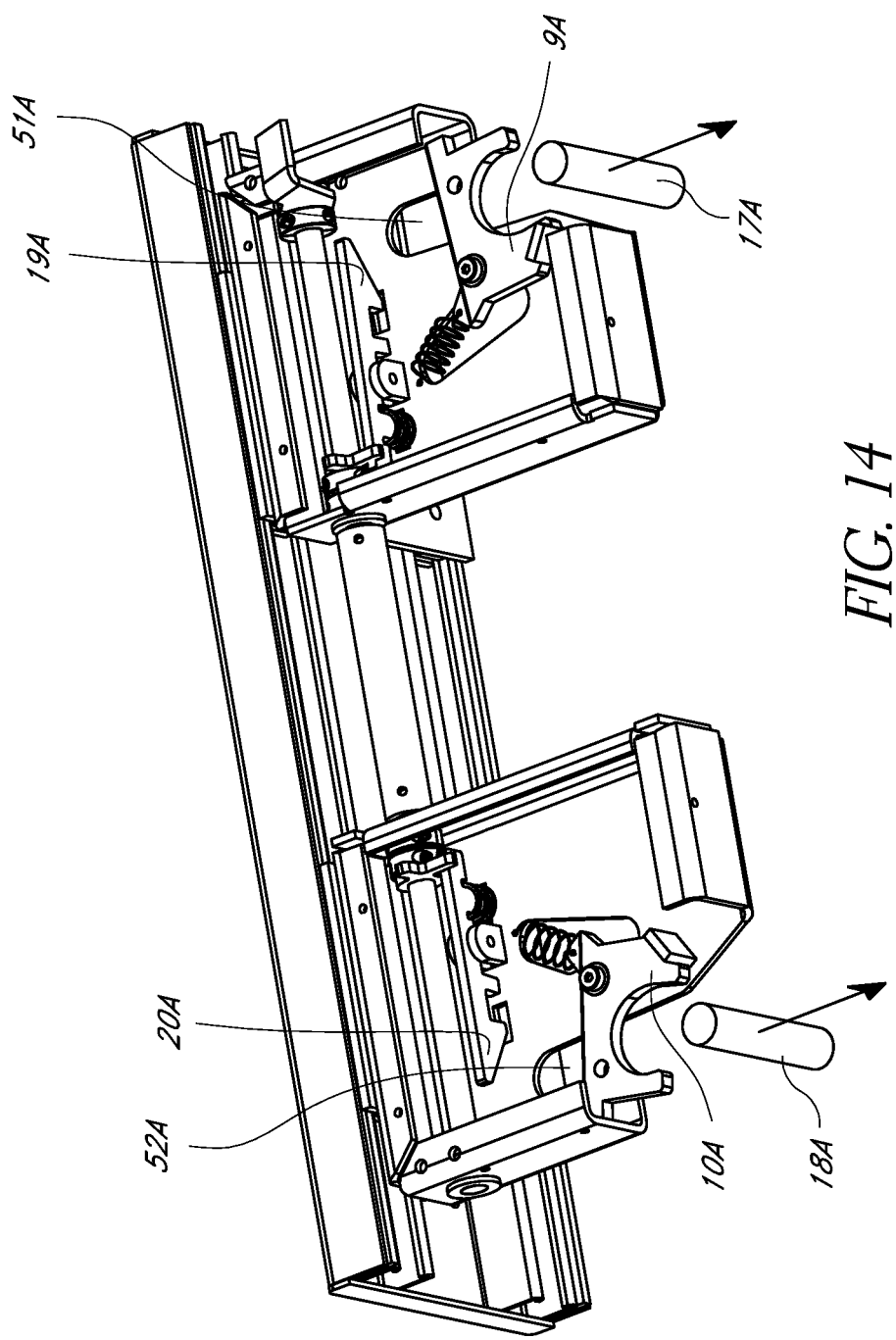
FIG. 14 illustrates a perspective view of the cart connection assembly of FIG. 4 after having returned to the open position.

As illustrated in FIG. 14, in certain embodiments, when the engagement members 9A, 10A are at or near the open position, the frame members 17A, 18A of the cart can be disengaged from the connection assembly 1A. For example, as the engagement members 9A, 10A rotate toward the open position, the frame members 17A, 18A can be removed from the recesses 53A, 54A of the engagement members and the notches 51A, 52A of the housing 3A. In some implementations, the biasing elements 15A, 16A rotate the engagement members 9A, 10A with sufficient force to facilitate separation of the frame members 17A, 18A from the connection assembly 1A. Such a configuration can, for example, provide an automatic ejection of the cart from the connection assembly 1A. After the cart has been separated from the connection assembly 1A, the connection assembly 1A is prepared to receive and secure the frame members 17A, 18A of another cart.

Figure 15:
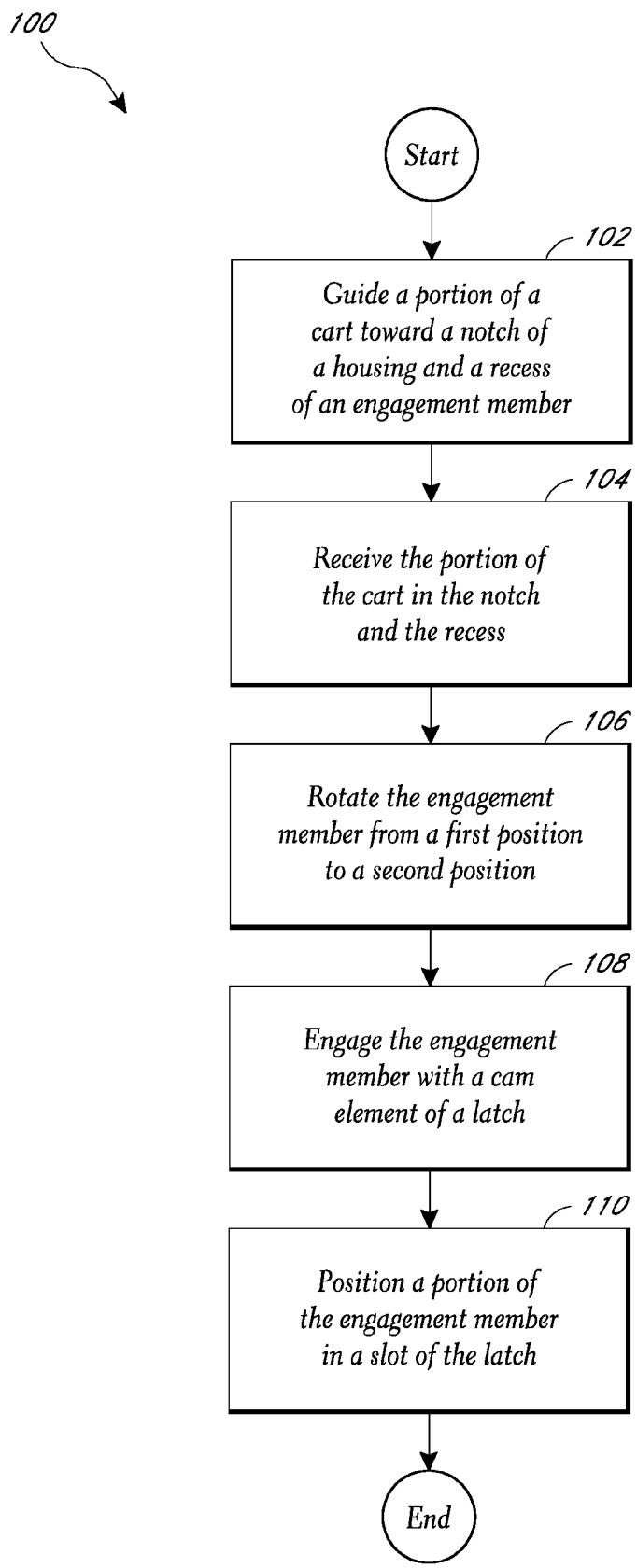
FIG. 15 is an embodiment of a method of connecting a shopping cart to a connection assembly, such as the connection assemblies of FIGS. 1 and 4.

With regard to FIG. 15, a method 100 of connecting the connection assemblies 1, 1A and the shopping cart is illustrated. In some embodiments, after the method starts, the method includes block 102, which includes guiding the shopping cart along a guide member generally toward a recess of an engagement member of the connection assemblies and a notch of a housing of the connection assembly. In some embodiments, the method includes block 104, which comprises receiving a leg portion of the shopping cart in the recess and the notch. Some variants of the method include engaging the leg portion of the cart with a portion of the recess.

In some embodiments, the method of connecting a shopping cart to the connection assembly includes block 106, which involves rotating the engagement member. For example, the engagement member can be rotated at least about 45° and/or equal to or less than about 120°. In some embodiments, the engagement member is rotated between about 85° and about 95°. Certain implementations include rotating the engagement member from a first position to a second position about an axis of rotation that is generally perpendicular to a front-to-rear axis of the cart. The engagement member can be configured to secure the shopping cart in the connection assembly. In certain embodiments, the method includes securing the cart to the connection assembly without an operator of the connection assembly adding any pins or screws. In certain embodiments, the method includes not using tools to lock the cart into the connection assembly.

In certain variants, the method includes block 108, which includes engaging the engagement member with a cam element of a latch member. For example, the cam element can be an angled, curved, or notched surface of the latch member. In certain embodiments, the engagement of the cam element and the engagement member displaces the latch relative to the engagement member.

Certain implementations of the method include block 110, which comprises positioning the engagement member in a slot in the latch, thereby inhibiting counter-rotation of the engagement member. Some embodiments include actuating a release (e.g., a foot lever, hand lever, or some other manual release mechanism) to disengage the engagement member from the slot. For example, the engagement member can be biased by a biasing element such that when an interference between the engagement member and the latch is no longer present (e.g., due to the displacement of the latch relative to the engagement member), the biasing element can rotate the engagement member, such as toward the first position. In some embodiments, the engagement member counter-rotates and discharges the shopping cart from the connection assembly.

Although the connection assembly has been disclosed in the context of certain preferred embodiments and examples, it will be understood by those skilled in the art that the connection assembly extends beyond the specifically disclosed embodiments to other alternative embodiments and/or uses of the invention and obvious modifications and equivalents thereof. For example, certain embodiments have only a single engagement member that couples with one post member of the cart. Further, some embodiments have engagement members that are configured to receive portions of the cart other than, or in addition to, the rear legs and/or wheel. For example, a lower horizontal cross-member of the cart can be received in a generally horizontal slot or notch of the housing. The connection assembly can be used, for example, with carts having rear and/or front wheels that are pivoting (e.g., about a vertical axis) or wheels that are non-pivoting. Further, the shopping cart can be motor-propelled or non-motor-propelled. However, certain embodiments of the disclosed connection assemblies are configured to engage only non-motor-propelled carts.

The apparatus and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Additionally, other implementations are within the scope of the following claims. In some cases, the actions recited in the claims can be performed in a different order and still achieve desirable results.

It is also contemplated that various combinations or subcombinations of the specific features and aspects of the embodiments can be made and still fall within the scope of the present disclosure. It should be understood that various features and aspects of the disclosed embodiments can be combined with or substituted for one another in order to form varying modes of the connection assemblies. For example, the width adjustment features of the connection assembly 1A can be employed on the connection assembly 1. Thus, it is intended that the scope of the present disclosure should not be limited by the particular disclosed embodiments described above.

What is claimed is:

1. A cart connection assembly configured to releasably connect with a shopping cart, the connection assembly comprising:
    a housing configured to couple with a cart retriever;
    an engagement member pivotally connected with the housing and having a recess and a flange, the engagement member rotatable relative to the housing about an engagement member pivot axis between a first position and a second position with respect to the housing, wherein when in the first position the engagement member is configured to receive a leg portion of a shopping cart in the recess, and wherein when in the second position the leg portion is inhibited from being removed from the recess;
    a biasing element configured to bias the engagement member toward the first position;
    a latch configured to pivot relative to the housing about a latch pivot axis and configured to engage the flange of the engagement member when the engagement member is in the second position, thereby retaining the engagement member in the second position, the latch pivot axis being not parallel with the engagement member pivot axis; and
    a release configured to disengage the latch and the flange, thereby allowing the engagement member to rotate from the second position to the first position.

2. The connection assembly of claim 1, wherein the recess opens toward a front of the housing, the recess opening being generally unobstructed thereby facilitating access by the leg portion of the shopping cart.

3. The connection assembly of claim 1, further comprising a plurality of engagement members connected with the housing and a corresponding plurality of latches configured to engage a respective one of the engagement members.

4. The connection assembly of claim 3, wherein a lateral spacing between at least two of the plurality of engagement members is adjustable, thereby allowing for the connection assembly to connect with shopping carts of various widths.

5. The connection assembly of claim 1, wherein when the leg portion is received in the recess and abuts the engagement member, the engagement member is encouraged to rotate from the first position toward the second position.

6. The connection assembly of claim 1, wherein the latch further comprises a cam element configured to engage the engagement member when the engagement member rotates from the first position toward the second position.

7. The connection assembly of claim 1, wherein the latch further comprises an opening configured to engage the flange of the engagement member.

8. The connection assembly of claim 1, wherein the latch has a latched position and an unlatched position, the connection assembly further comprising a spring configured to bias the latch toward the latched position.

9. The connection assembly of claim 8, wherein the release is configured to rotate the latch from the latched position to the unlatched position.

10. The connection assembly of claim 1, wherein the release is manually actuated.

11. The connection assembly of claim 1, wherein the leg portion of the shopping cart comprises a rear leg portion.

12. The connection assembly of claim 1, wherein the housing is pivotably mounted to the cart retriever.

13. The connection assembly of claim 1, further comprising the cart retriever, the housing being coupled with the cart retriever.

14. The connection assembly of claim 1, further comprising a front-to-rear axis along which the shopping carts are collected, and wherein:
    the housing further comprises a notch having a notch axis that is not perpendicular to the front-to-rear axis;
    the recess comprises a recess axis extending along a longitudinal length of the recess;
    the notch axis and the recess axis are not perpendicular when the engagement member is in the first position, thereby configuring the housing and the engagement member to allow the leg portion of the cart to be received in the notch and the recess; and
    the notch axis and the recess axis are not parallel when the engagement member is in the second position, thereby configuring the housing and the engagement member to inhibit removal of the cart from the notch and the recess.

15. The connection assembly of claim 1, wherein the biasing element biases the engagement member toward the first position such that the engagement member rotates from the second position toward the first position with sufficient force to eject the leg portion of the cart from the recess.

16. The connection assembly of claim 1, wherein the latch pivot axis is perpendicular to the engagement member pivot axis.

17. The connection assembly of claim 14, wherein the notch axis is parallel to the front-to-rear axis.

18. The connection assembly of claim 14, wherein the notch axis and the recess axis are parallel when the engagement member is in the first position.

19. The connection assembly of claim 14, wherein the notch axis and the recess axis are perpendicular when the engagement member is in the second position.

* * * * *